United States Patent
Ingram et al.

(10) Patent No.: US 8,532,958 B2
(45) Date of Patent: Sep. 10, 2013

(54) REMOTE IDENTIFICATION OF NON-LAMBERTIAN MATERIALS

(75) Inventors: Paul M. Ingram, Dallas, TX (US);
Joseph C. Landry, Dallas, TX (US);
John J. Coogan, Bedford, TX (US);
Paul D. Shocklee, Plano, TX (US)

(73) Assignee: Raytheon Company, Waltham, MA (US)

( * ) Notice: Subject to any disclaimer, the term of this patent is extended or adjusted under 35 U.S.C. 154(b) by 452 days.

(21) Appl. No.: 12/851,991

(22) Filed: Aug. 6, 2010

(65) Prior Publication Data

US 2012/0035884 A1    Feb. 9, 2012

(51) Int. Cl.
*G06F 17/18* (2006.01)

(52) U.S. Cl.
USPC .......................................... 702/181; 252/582

(58) Field of Classification Search
USPC ................. 702/158, 159, 179, 181, 182, 188; 703/6; 252/582
See application file for complete search history.

(56) References Cited

U.S. PATENT DOCUMENTS

2010/0133488 A1* 6/2010 Giakos ........................ 252/582

OTHER PUBLICATIONS

"An Atmospheric Correction Algorithm for Hyperspectral Imagery," Sanders, Lee C.; Doctoral Dissertation, Rochester Institute of Technology, 1999 (188 pages).

"The emperical line method for the atmospheric correction of IKONOS imagery," Karpouzli, E. et al., International Journal of Remote Sensing, ISSN1366-5901, copyright 2003 (8 pages).

U.S. Appl. No. 13/100,878, filed May 4, 2011, entitled "In-Scene Determination of Aerosol Parameters From Imagery," (30 pages).

U.S. Appl. No. 12/851,844, filed Aug. 6, 2010, entitled "Remote Material Identification Process Performance Prediction Tool," (37 pages).

"A Review of Reflectance Nomenclature Used in Remote Sensing," Carol J. Bruegge, et al., dated Jan. 7, 2000 (10 pages).

"Three-Dimensional Appearance Characterization of Diffuse Standard Reflection Materials," Andreas Hope, et al., pp. 295-304, published Apr. 29, 2010 (11 pages).

"Lava Flow Identification and Aging by Means of LiDAR Intensity: The Mt. Etna Case," Francesco Mazzarini, et al., J. Geophys. Res., vol. 112, No. B2, Feb. 2007 (43 pages).

"Better Analysis of Hyperspectral Images by Correcting Reflectance Anisotropy," Eyal Ben-Dor, et al., SPIE Newsroom, copyright 2010 (3 pages).

"Impact of BRDF on Physics Based Modeling as Applied to Target Detection in Hyperspectral Imagery," Emmett J. Ientilucci, et al., Proc. of SPIE vol. 7334, copyright 2009 (12 pages).

"Pixel Identification Techniques Using Hybrid Spectral Algorithms and Physics Based Models," prepared for NGA, Rochester Institute of Technology, College of Science, Center for Imaging Science, Digital Imaging and Remote Sensing Laboratory, Rochester, New York, US, Dec. 2009 (9 pages).

(Continued)

*Primary Examiner* — John H Le
(74) *Attorney, Agent, or Firm* — Schwegman Lundberg & Woessner, P.A.

(57) ABSTRACT

In one example of a method for remote identifying a non-Lambertian target material, a spectral signature for a target is determined from each of at least two different sets of imagery acquired at different angles, and compared to a predicted signature for a candidate material for each of the at least two different angles. The predicted signatures take into account the known anisotropy of reflectance, and thus also radiance, of the candidate material.

12 Claims, 12 Drawing Sheets

(56) References Cited

OTHER PUBLICATIONS

"Optical Remote Sensing of Benthic Habitats and Bathymetry in Coastal Environments at Lee Stocking Island, Bahamas: A Comparitive Spectral Classification Approach," Eric M. Louchard, et al., pp. 511-521, dated Oct. 1, 2001 (11 pages).
"Models and Methods for Automated Material Identification in Hyperspectral Imagery Acquired Under Unknown Illumination and Atmospheric Conditions," Glenn Healey, et al., IEEE Transactions on Geoscience and Remote Sensing, vol. 37, No. 6, Nov. 1999, pp. 2706-2717 (12 pages).
"Hyperspectral Image Processing for Automatic Target Detection Applications," Dimitris Manolakis, et al., Lincoln Laboratory Journal, vol. 14, No. 1, dated 2003, pp. 79-116 (38 pages).
"Introduction to Hyperspectral Imaging," Randall B. Smith, MicroImages, Inc., dated Jul. 14, 2006 (24 pages).
"Imaging Spectrometry of Urban Materials," Dar A. Roberts, et al., dated Mar. 2004 (31 pages).
"Tensor Methods for Hyperspectral Data Analysis: A Space Object Material Identification Study," Qiang Zhang, et al., Optical Society of America, copyright 2008 (46 pages).
"Measurement and Statistical Modeling of BRDF of Various Samples," Hanlu Zhang, et al., Optica Applicata, vol. XL, No. 1, 2010, pp. 197-208 (12 pages).
"Spectral Imaging for Remote Sensing," Gary A. Shaw, et al., Lincoln Laboratory Journal, vol. 14, No. 1, 2003, pp. 3-28 (26 pages).
"Bidirectional Reflectance Distribution Function and Hemispherical Reflectance of JSC Mars-1," Georgi T. Georgiev, et al., Society of Photo-Optical Instrumentation Engineers, copyright 2002, pp. 165-175 (11 pages).
"Shadow-Insensitive Material Detection/Classification with Atmospherically Corrected Hyperspectral Imagery," Steven M. Adler-Golden, et al., SPIE, 2000, vol. 4381, Algorithms for Multispectral, Hyperspectral and Ultraspectral VII, pp. 460-469, (10 pages).
"Target Detection and Classification at Kernel Blitz 1997 Using Spectral Imagery," Jeffrey D. Sanders, Thesis, Naval Postgraduate School, Dec. 1998 (115 pages).
"Development of Global Aerosol Models Using Cluster Analysis of Aerosol Robotic Network (AERONET) Measurements," Ali H. Omar, et al., published Mar. 1, 2005 (14 pages).
"Iterative Retrieval of Surface Emissivity and Temperature for a Hyperspectral Sensor," Christoph A. Borel, submitted to the proceedings for the First JPL Workshop on Remote Sensing of Land Surface Emissivity, May 6-8, 1997 (8 pages).
Remer, et al., "Algorithm for Remote Sensing of Tropospheric Aerosol from MODIS: Collection 5", Algorithm Theoretical Basis Document, [Online]. Retrieved from the Internet: <http://modis.gsfc.nasa.gov/data/atmos_atbd.php>, (Nov. 1, 2006), 87 pgs.
Robert, Ryan E, "A Simplified Approach to Radiometric Vicarious Calibration", (Aug. 2010), 1 pg.

\* cited by examiner

REMOTE IDENTIFICATION OF NON-LAMBERTIAN MATERIALS

The U.S. government may have certain rights in this invention pursuant to its funding under contract No. 2004-K724300-000.

TECHNICAL FIELD OF THE INVENTION

The invention relates generally to remote sensing and material identification.

BACKGROUND OF THE INVENTION

Material identification using a remotely located sensor is used for a number of purposes, for example detection, identification and classification of objects within a scene, and applications, for characterization of urban areas, search and rescue, differentiating combatant forces, and detection of attempts at camouflage, denial and deception. It is based on the general principle that the observed spectral radiance of any given target will vary based on, among other things, the type of the material of which the surface of the target is made. Different materials absorb, reflect and emit differently, depending on wavelength. The spectral radiance of a target, the target being the surface of a particular object within a scene, from a given angle or direction can be measured using various types of sensors, depending on the wavelengths of interest. Based on the measured or observed spectral radiance it is possible to determine the material of which the surface is made.

Several types of remote sensors and imaging modalities have been used to generate image sets containing both spectral and spatial information of real scenes for purposes of detection, identification or classification of objects within the scene. Electro-optical sensors are typically single band, multispectral or hyperspectral. A multispectral sensor detects and records radiation in a limited number of bands that are typically fairly wide, for example in the red, blue, green, and near-infrared bands of the spectrum. A hyperspectral sensor detects radiation in a large number of contiguous bands, typically throughout the visible and near-infrared regions of the spectrum. Other types of imaging modalities, for example, synthetic aperture radar (SAR), typically operate only in a single band. The sensors are typically (but do not have to be) placed in satellites or aircraft and acquire images of portions of the surface of the earth during flyovers at relatively high altitudes. However, it is possible for the sensors to be placed on the ground.

Each "image"—also called "imagery" or "image set"—of a scene generated by such a sensor comprises spatial information, typically in two dimensions. It also contains spectral radiance information, which would include the radiance of at least one predetermined band of wavelengths that the sensor can detect. The material of which at least the surface of an object within the scene is made, called the "target," is identified by selecting within the image pixels comprising the target and then evaluating the spectral radiance of those pixels to develop a spectral signature for the target that can be compared to spectral signatures for various materials. In automatic material identification, a specially programmed computer is used to process image data from a remote sensor and other data to identify the material of the target.

The spectral radiance, which is radiance at a given wavelength or band, for any given target in a scene will depend on the material of which the target is made, as well as the spectrum and angle of irradiation being reflected by the target, the atmospheric conditions through which both the illuminating irradiation and the reflected radiation travels, and the spectrum of any emitted radiation. In order to make the identification, measured spectral radiance is typically transformed to an estimated reflectance. Reflectance is the ratio of the measured radiance from an object divided by the radiance reflected by a 100% Lambertian reflector. When using images of real targets, reflectance is sometimes estimated by taking into account relevant environmental conditions, such as the radiation source and atmosphere, under which the imagery was acquired.

The way in which a surface reflects or emits radiation can be generally categorized as either Lambertian or non-Lambertian. A Lambertian surface scatters electromagnetic radiation equally in all directions, without regard to the direction of illumination. Thus, its reflectance is generally isotropic, or the same in all directions. A non-Lambertian surface does not scatter incident electromagnetic radiation equally in all directions. Examples of non-Lambertian surfaces include those that are backscattering, meaning that the light scatters predominantly toward the illumination source; forward scattering, meaning scattering predominantly in directions away from the illumination source; and specular, meaning reflecting the illumination source like a mirror. Many man-made objects or targets exhibit non-Lambertian reflectance.

In order to identify a material within an image, prior art methods treat the material as Lambertian. The candidate materials are also treated as Lambertian. The directional hemispherical reflectance (DHR) for each candidate material, which relates, for a given wavelength or band of wavelengths and direction of incident irradiation, reflected radiance across the entire hemisphere, is used to predict the spectral reflectance of the candidate material.

SUMMARY

Treating all targets as Lambertian in remote material identification processes tends to yield erroneous results or no results at all when remotely identifying non-Lambertian materials using spectral signatures. The invention generally relates to methods and apparatus useful in connection with identification using remote sensors of non-Lambertian target materials.

According to one example of a method for remotely identifying a non-Lambertian target material, a spectral signature for a target is determined from each of at least two different sets of imagery acquired at different angles, and compared to a predicted signature for a candidate material for each of the at least two different angles. The predicted signatures take into account the known anisotropy of reflectance and/or emissivity of the candidate material. If the target material is non-Lambertian, using two angles and predicted spectral signatures for candidates for those two angles tends to increase the probability of correct identification of the target material and tends to decrease the probability of false matches.

According to another example of a method for remotely identifying materials, predicted spectral signatures for non-polarimetric, reflective imagery are determined from bi-directional reflectance distribution functions and do not rely solely on DHR.

According to yet a different example of a method for remote identifying materials, an analysis of uncertainties in an estimated multi-angle target spectral signature and a multi-angle candidate spectral signature is used to determine level of confidence in a decision on a match. Correlated errors in the multi-angle spectral signatures of the target and the candidate material are, preferably, considered.

DETAILED DESCRIPTION

In the following description, like numbers refer to like elements.

Figure 1A:
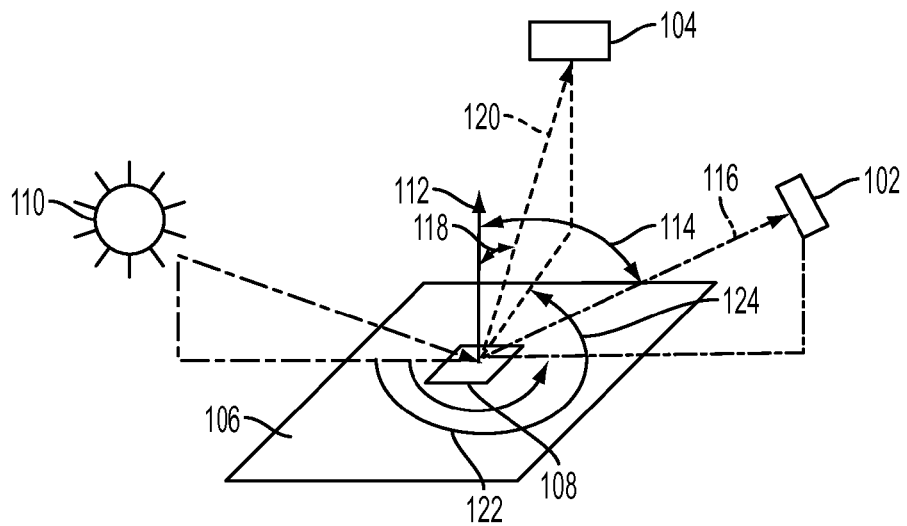
FIG. 1A is a schematic illustration of an area containing a target of interest, being illuminated by the sun and imaged by two remote, passive sensors.
Figure 1B:
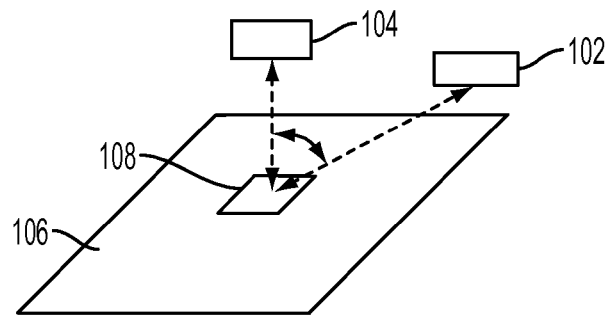
FIG. 1B is a schematic illustration of the area of FIG. 1A being imaged by two remote, active sensors.
Figure 1C:
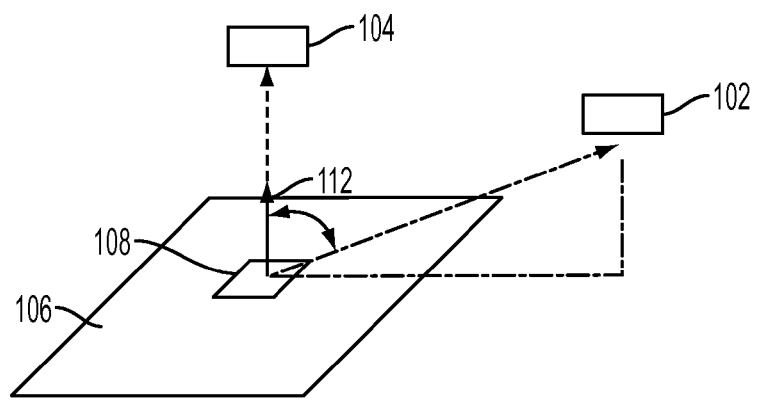
FIG. 1C is a schematic illustration of the area of FIG. 1A with an emissive target being imaged by two sensors.

Referring to FIGS. 1A, 1B and 1C, each figure schematically illustrates different examples of acquiring multi-angle imagery. Sensors 102 and 104 each acquire imagery of at least a portion of an area of earth 106—a scene—containing one or more targets of interest, for example, target 108. In the example of FIG. 1A, the sun 110 is illuminating the scene. However, other sources of illumination of the target are possible, including, for example, other man-made sources of illumination. FIG. 1B illustrates the case of the sensors 102 and 104 being active sensors, meaning that they illuminate the scene with radiation and measure reflectance of that radiation. Examples include synthetic aperture radar (SAR) systems and light detection and ranging (LIDAR) systems. An active sensor, such as used for mono-static SAR, is illustrated by FIG. 1B. However, the illumination source need not necessarily be co-located with the sensor, as in multi-static SAR. Radiance from a target may also include emitted radiation, in particular radiation in the infrared wavelengths, which is dependent on the target's temperature. Acquisition of imagery by sensors for detecting such emitted radiation is illustrated by FIG. 1C.

Aircraft or satellites, for example, carry the sensors. However, the sensors could be placed anywhere that affords a view of the area containing a target of interest. Images acquired from the sensors are stored on computer readable media for further processing. The data is transmitted or delivered to an image processing facility (not shown) for reconstruction (if necessary) and further processing. The same or a different facility can perform material identification using the processed imagery.

Sensors 102 and 104 that are positioned in each of FIGS. 1A, 1B and 1C are intended to represent two different image acquisition angles. The acquisition angles, also referred to as the acquisition geometry are, unless the context otherwise indicates, angles in three dimensions that are typically defined by a zenith angle (measured from the target surface normal) and an azimuthal angle. Different image acquisition angles can differ in terms of zenith angle, azimuthal angle, or both. Although they are illustrated as two separate sensors, sensors 102 and 104 in each of the figures are also intended to represent the situation in which the same sensor moves positions. They can also be different sensors of the same type or different types of sensors.

In the example that is illustrated in FIG. 1A, sensors 102 and 104 are passive electro-optical sensors. The sensors can be single band, multispectral, or hyperspectral. Sensor 102 acquires imagery of the target from along a first direction 116, and the second sensor 104 acquires an image of the target from a second direction 120. "Direction" refers to the direction of propagation of radiation from the target to the sensor or, in the case of the illumination source, from the direction of propagation of irradiation from the source to the target. In the case of sensor 102, the zenith angle 114 is measured between the normal 112 and direction 116, and, in the case of sensor 104, it is the angle 118 measured between normal 112 and direction 120. The azimuthal angle for sensor 102 is angle 122, and for sensor 104, it is angle 124. In this example, the plane of the surface of the target is presumed to be the plane of the terrain 106, but it does not need to be.

Figure 2:
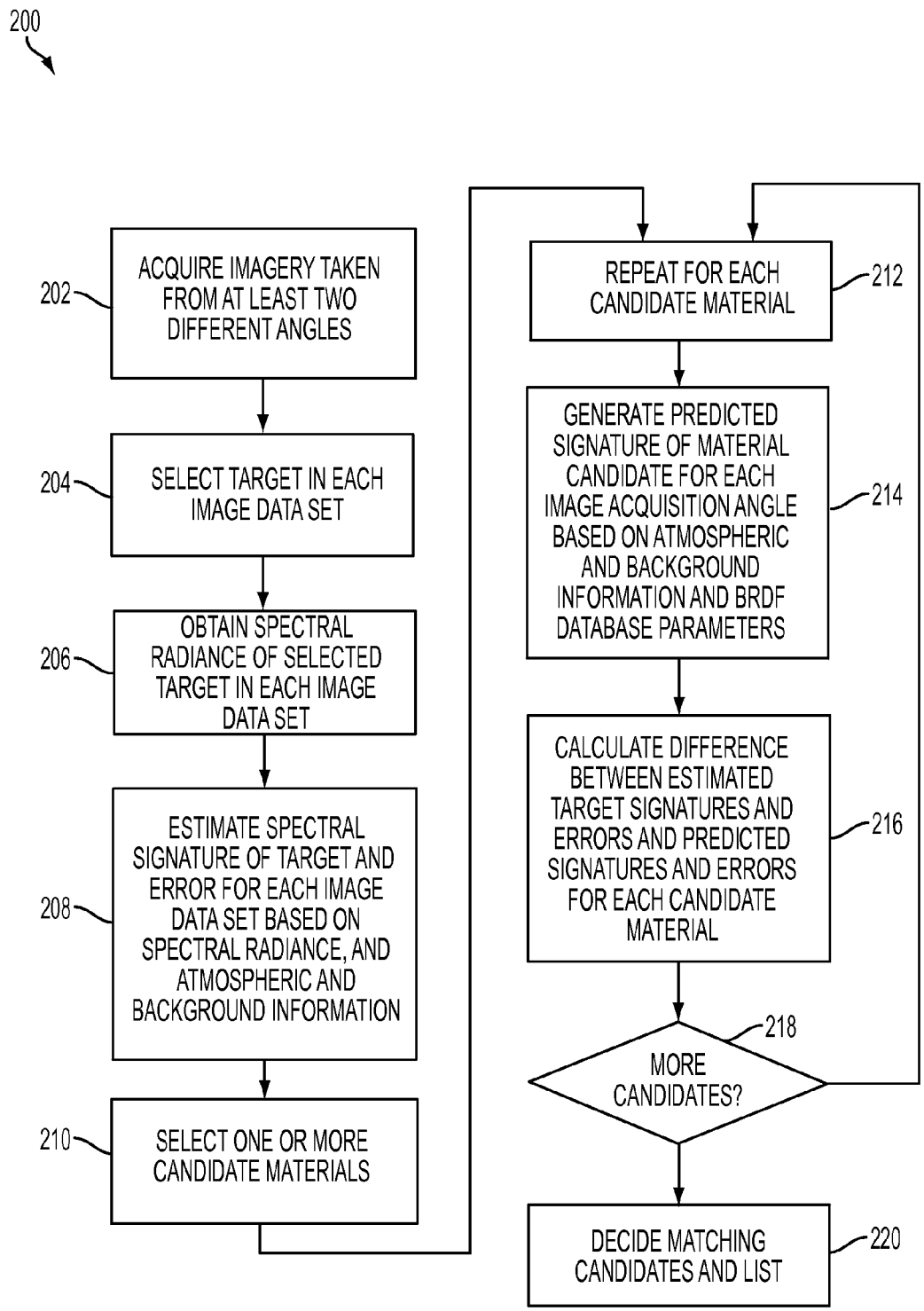
FIG. 2 is a flow diagram of a method for identifying a material using remote sensors.

Referring now also to FIG. 2, flow chart 200 illustrates the basic steps of a method for identifying the material, such as target 108 of FIG. 1, using images taken from two or more acquisition geometries. Certain of the steps are performed by a specially programmed computing system. The processing steps are the same for both single-modality imagery (images using the same modality) and multi-modality (images taken using different modalities) operation.

As represented by step 202, two or more images containing the same target are acquired at step 202 using remote imaging sensors. The images need to each contain the target, but otherwise do not need to be coextensive, or to be taken using the same type of sensor or imaging modality. At least two of the images are acquired from different angles. The sensors can be, for example, mounted in aircraft or satellites moving across the area or, in some situations, positioned on the ground.

Also obtained is the information about the environmental conditions under which the images were acquired. The particular information that is obtained depends on the imaging modality. Environmental conditions typically include atmospheric conditions, which can include aerosol, water vapor content, and temperature. Environmental information can be acquired in connection with the acquisition of each image. It can also be obtained subsequent to the acquisition of the images using contemporaneous observations recorded in other databases. The particular environmental information that is acquired depends at least in part on the modality of the imagery.

More than two sensors can be used to acquire images of a target. The same sensor can also be used to acquire images from each of the angles. If different sensors are utilized to acquire the two or more images of the target, the sensors need not utilize the same imaging modality. The acquired images are typically recorded on local media. The images are communicated to a remote facility for processing and use by transporting them on computer readable physical media, transmitting them using signals, or by combination of communication modes.

In the example of FIG. 1A, sensors 102 and 104 are of a type that sense radiation in the visible and near infrared bands that has been reflected by the target material. The source of irradiation incident on the target is, in this example, the sun 110, but there could be artificial sources illuminating the target. In this example, sensor 102 is positioned in a "near specular" geometry and sensor 104 is positioned in an "off specular" geometry. Sensor 102 is positioned to detect the spectral radiance within the forward scattering lobe of the radiation from sun 110 reflected by target 108. The width of the forward scattering lobe, and thus the range of angles (azimuthal and zenith) at which the sensor is positioned, depends on the particular material of which the surface of the target is made. The sensor 102 need not be located exactly in the specular direction, which is 180 degrees in azimuth from the sun and the same zenith angle as the direction of irradiation on the target. In fact, depending on the type of sensor and illuminating source, placing a sensor in this position could result in the sensor being saturated and thus unable to provide spectral information. Sensor 104 is acquiring an image that is used to determine spectral radiance at an acquisition angle outside the forward scattering lobe. Either of the two sensors could be, instead, located within the back scattering lobe of reflected radiation. Spectral radiance measurements within the forward scattering lobe and outside the forward scattering lobe will tend to give the best identification results for reflected radiation of non-Lambertian targets.

For active imaging modalities in which the illuminating source and the sensor are co-located, such as mono-static SAR and LIDAR, better identification results for non-Lambertian materials tend to be achieved when at least one of at least two images are, for example, taken near normal orientation to the target surface and at least one is taken at an elevation off the normal orientation. This is illustrated by FIG. 1B. Multi-static SAR, in which the source of the microwave radiation is not co-located with the sensor, and images acquired of artificially illuminated scenes are treated like the reflective imaging modality, such as shown in FIG. 1A. The microwave radiation source would be treated similarly to the sun 110. For emissive imaging modalities, such as infrared, in which the target is emitting radiation, taking one image from a direction that is near normal to the surface, and another taken at an elevation far from normal to the surface tends to give better identification results for non-Lambertian targets. This is illustrated by FIG. 1C.

The target is delineated in each of two or more images at step 204 by selecting the pixels in each image that comprise a target of interest. The selection can be done manually or automatically by a computing system based on predetermined criteria.

At step 206 the spectral radiance of the target, which can be comprised of both reflected and emitted radiation, is obtained by a specially programmed computing system from at least two of the images that are acquired at different angles. The spectral signature of the target and error bars for the signature are estimated for each image at step 208 by the specially programmed computing system. The errors bars are based on the errors sources associated with the target signature. The target signature for each image is then concatenated into a multi-angle target spectral signature.

Table 1 lists the different imaging modalities and, for each modality, the type of target signature that is estimated, and sources of error in the determining the estimated target signature and its error bars.

TABLE 1

| Imaging Modality | Target Signature | Error Sources |
|---|---|---|
| Non-polarimetric (non-PI) reflective single band or multispectral (MS) | Reflectance or radiance spectrum | Atmospheric conditions Radiometric calibration BRDF (bi-directional reflectance distribution function) measurements |
| Non-PI reflective hyperspectral (HS) | Reflectance or radiance spectrum | Same as non-PI reflective MS, plus: Spectral calibration |
| Non-PI emissive single-band or MS | Radiance spectrum | Same as non-PI reflective MS |
| Non-PI emissive HS | Radiance spectrum | Same as non-PI reflective MS, plus: Spectral calibration |
| Polarimetric (PI) reflective or emissive single-band or MS | Radiance spectrum | Same as non-PI reflective MS, plus: PI calibration |
| PI reflective or emissive HS | Radiance spectrum | Same as PI reflective MS, plus: Spectral calibration |
| Synthetic Aperture Radar (SAR) | Reflectance or radiance spectrum | Same as non-PI reflective MS |

Although the type of target signature for non-polarimetric reflective imagery is indicated to be spectral reflectance, the type of signature used in the process can either be spectral radiance or spectral reflectance. Spectral reflectance signatures can be determined from the image radiance in two ways. If the sensor output is linearly related to radiance and the scene contains horizontal Lambertian objects of known reflectance, the empirical line method can be used. The other way is to use model-based atmospheric compensation terms derived from atmospheric parameters and background reflectance.

One or more candidate materials are selected at step 210. For each candidate material, as indicated by step 212, a candidate spectral signature is estimated at step 214 by the specially programmed computing system for each image based on acquisition geometry, the imaging modality, surface reflection parameters from a bi-directional reflectance distribution function (BRDF) database for candidate materials, and relevant imaging conditions, which include background and atmospheric information. The candidate spectral signatures are concatenated into a multi-angle candidate spectral signature. If the estimated target spectral signature for particular acquisition geometry is determined in the radiance domain, the corresponding predicted candidate spectral signature is also determined and expressed in the radiance domain. Similarly, for estimated target spectral signatures expressed in reflectance, the predicted candidate spectral signatures are determined in the reflectance domain.

Candidate spectral signatures are determined by taking into account the reflectance anisotropy, which is defined for a given material by the BRDF. If the imaging modality is reflective, the reflectance signature of the candidate material is calculated from its Lambertian-equivalent solar reflectance signature and directional hemispherical reflectance signature from the BRDF database. BRDF is the ratio of reflected radiance to incident irradiance at a given wavelength, and at given directions of propagation. The direction is characterized by a zenith angle with respect to the normal to the surface of the material, and an azimuth angle, as indicated in FIG. 1. A BRDF for a given material can be empirically measured for all wavelengths and directions, or it can be predicted from a BRDF model for the material, and thus has error associated with it.

The predicted candidate signatures are then used in a decision process to decide if the candidate material matches the target within a predetermined level of confidence. At step 216 the specially programmed computing system calculates the differences between the estimated target multi-angle signature and the predicted candidate spectral signature. Steps 214 and 216 are, as indicated by steps 212 and 218, repeated for each candidate material. A decision is made at step 220 as to which, if any, of the candidate materials match the target material to within the predetermined level of confidence. Many approaches to the decision process are possible. One example is a chi-square test. When a candidate signature matches the target signature closely enough, the candidate material is determined by the process to be a possible target material and is listed at step 220 as such by the computing system executing the process.

Figure 3:
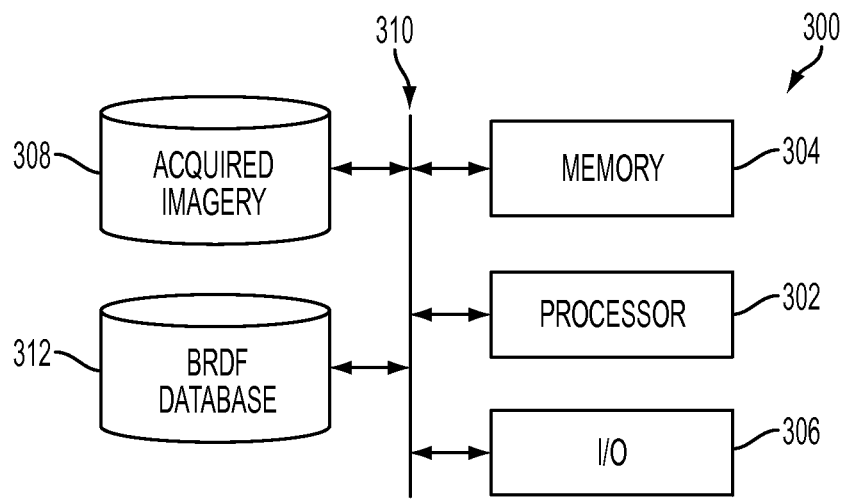
FIG. 3 is a schematic illustration of a representative computing system specially programmed to execute the methods for identifying materials using remote sensors according to the method of FIG. 1, and any one or more of examples of methods for different imaging modalities described below.

FIG. 3 illustrates a representative, specially programmed computing system 300 for executing software that performs at least the functions described herein in connection with steps 206, 208, 210, 214, 216, 218, and 220 of the material identification process of FIG. 2. The computing system 300 comprises one or more processors, which are represented by processing entity 302, and working memory 304, in which program instructions are loaded for execution by processing entity 302. These instructions can also be stored or contained on any type of electronic, optical or magnetic media, as well as on transient signals, that can be read by the computing system. The instructions, which may first need to be compiled, are loaded into the memory 304 for execution by the processor. Examples of such media include mass data storage and removable media. Information and data on which the process acts, as well as resulting from operations of the processing entity 302, are stored in memory 304.

The system also includes an input/output subsystem 306, which is representative of one or more subsystems through which the computing system may interact with a user or may communicate with other computing systems by transmitting information using signals. Examples of the one or more subsystems include a display, a user input device, such as a keyboard, mouse, touch pad, touch screen, or remote gesture recognition device, through which a user may interact with the program, and interfaces for communicating with other computing systems or devices. No particular computer architecture is intended to be implied by this example. The example is intended to be representative generally of computing systems suitable for being programmed to perform these processes, and not limiting. Furthermore, the processing need not be limited to a single computing system, but could be distributed among more than one computing system. Furthermore, different programs running on computing system 300 or on multiple computing systems may execute parts of the process described by FIG. 2.

The process carried out the computing system 300 operates on imagery stored in imagery storage system 308. Storage system 308 is intended to be representative of any type of system for storing acquired imagery. It could be a simple file system or one or more databases, for example. Imagery acquired through, for example, sensor 102 and 104 of FIG. 1 would be stored in system 308. The storage system 308 is illustrated as being local, communicating over bus 310 with the processor 302 and memory 304. It could be stored on a local hard drive, for example. However, it could also be located on a mass data storage device located elsewhere on a local or wide area network, or on a remote server. BRDF database 312 is representative of one or more databases containing predetermined or previously measured information or models for determining direction and wavelength dependent surface reflectance characteristics and parameters of candidate materials. It is, like acquired imagery 308, shown as being stored locally; it communicates over bus 310 with the processor. However, it can be stored on a local or wide area network, or accessed remotely through a server.

Figure 4:
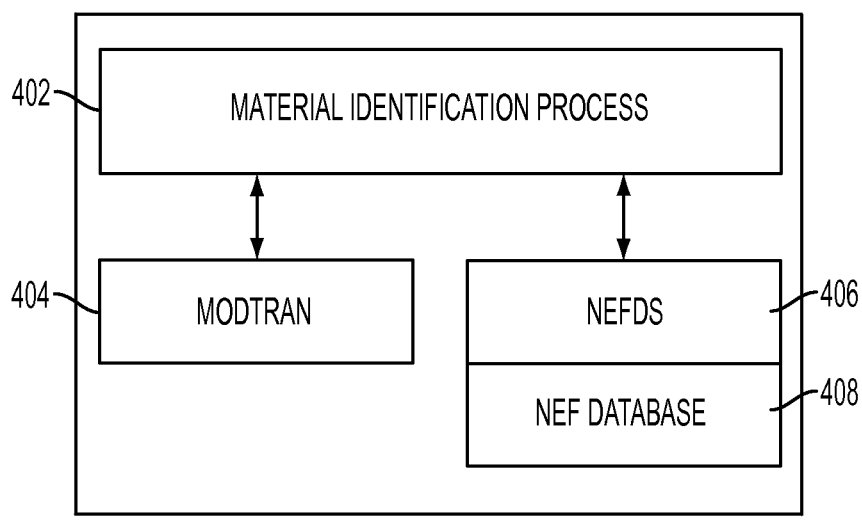
FIG. 4 is a schematic illustration of one representative implementation of programs executing on the computing system of FIG. 3 when it is executing certain steps of the process of FIG. 2.

Referring to FIG. 4, illustrated is an example of one possible arrangement of programs that can be used to implement the process of FIG. 2 and the processes described below on a computing system, such as computing system 300. Program 402 carries out the material identification process generally illustrated by FIG. 2. However, it makes use of, among others, two modeling programs to carry out several of the steps. Program 404 is called MODTRAN®, which is a program owned by the U.S. Air Force Research Laboratory, maintained by Spectral Sciences Inc. and distributed by Ontar Corporation. It models atmospheric propagation of electromagnetic radiation, including the effects of molecular and particulate absorption/emission and scattering, surface reflections and emission, solar/lunar illumination, and spherical refraction. MODTRAN® is used by the basic program to determine how the atmosphere affects the radiation incident on, and reflected from, the target. Program 406 is a suite of publicly available programs called the Nonconventional Exploitation Factor Data System (NEFDS). The Nonconventional Exploitation Factor (NEF) database 408 is a database of BRDF for a large number of materials. Information about the NEFDS programs and the NEF database was developed by the Cortana Corporation for the National Geospatial-Intelligence Agency (NGA) of the United States. The NEFDS programs use the database to calculate, among other things, BRDF, while taking into consideration the properties of the target material, the material background, the measuring sensors, and the atmospheric environment. The database contains pre-measured surface reflection parameters for over 400 materials corresponding to a wide variety of objects ranging from camouflage to paint. A NEFDS function can be used to query for BRDF values of any of these materials at a range of wavelengths and any given geometry, and is used by the process for, among other things, predicting candidate spectral signatures and transforming target radiance signatures into target reflectance signatures. No particular programming arrangement, architecture or framework is intended to be implied by the foregoing examples.

Figure 5A:
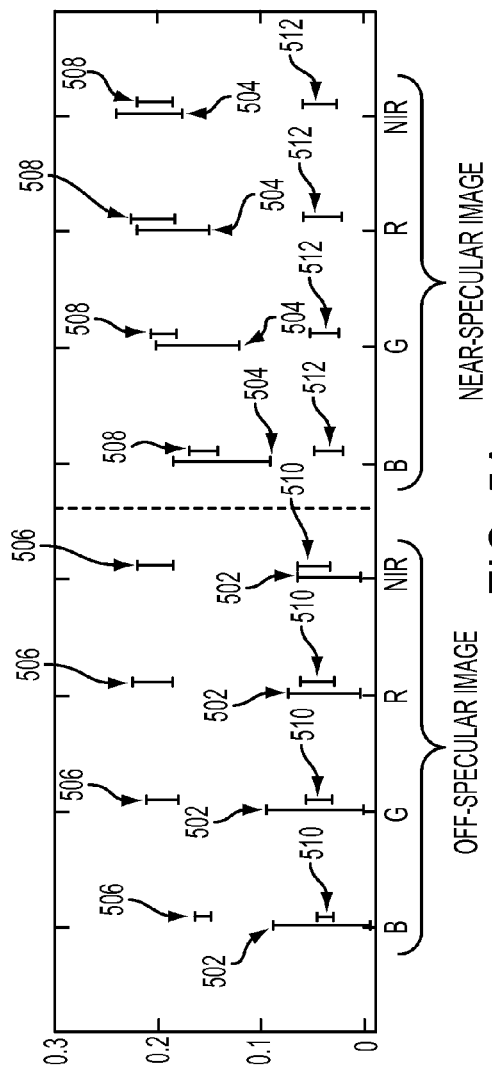
FIGS. 5A and 5B are graphs illustrating a graphical comparison of multi-angle target signatures with multi-angle candidate signatures.
Figure 5B:
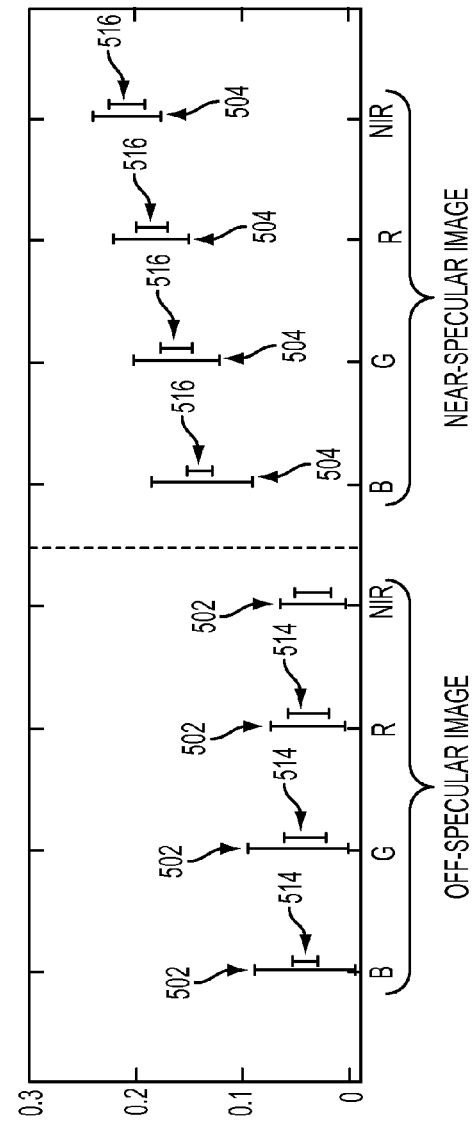

FIGS. 5A and 5B are graphs with reflectance on the vertical axis and spectral bands on the horizontal axis displaying representations of a concatenated, multi-angle spectral signature of a target and several candidate materials. FIG. 5A illustrates two examples where incorrect candidate material signatures are compared to the target signature which is represented in each figure by error bars 502 (off-specular image)

and 504 (near-specular image). The signature of the first incorrect candidate is represented by error bars 506 for the off-specular image and error bars 508 for the near specular image. If only the near-specular image was used for identification matching, the error bars 506 are close enough that the first incorrect candidate material would result in a false match. However, when both specular and off-specular images are considered, the differences between the signatures in the off-specular image prevent the target from being confused with the first incorrect candidate material. The signature of the second incorrect candidate is represented by the error bars 510 (off-specular) and 512 (near specular). In this case, the signature of the second incorrect candidate matches the target signature in the off-specular image but not in the near-specular image. The use of both images again suppresses the second incorrect material as a false match. FIG. 5B graphically illustrate a match between a candidate material's signature, represented by error bars 514 (off-specular) and 516 (near-specular).

Following are descriptions of examples of implementations of the process of FIG. 2 for different imaging modalities.

Non-Polarimetric Reflective Imagery

Figure 6:
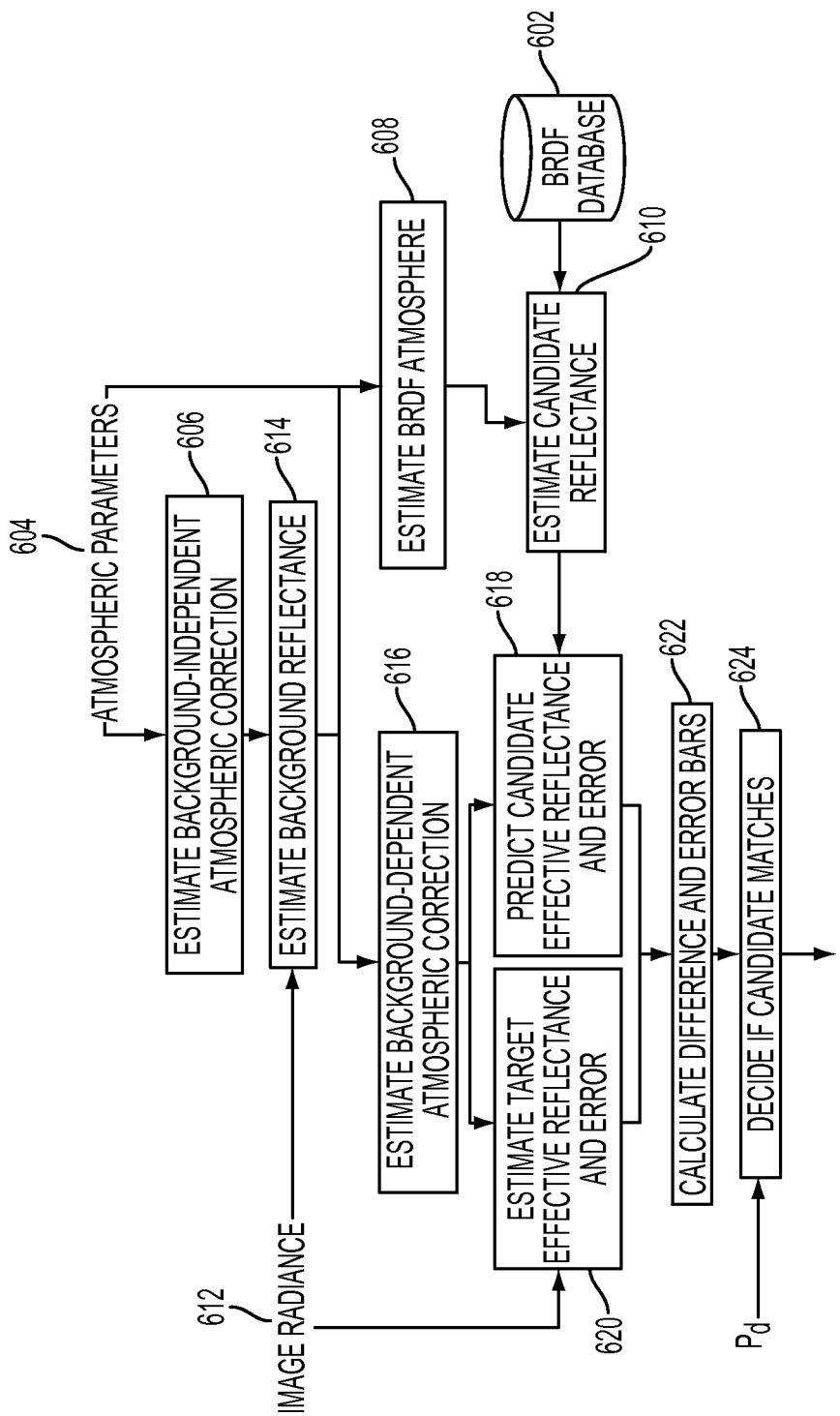
FIG. 6 is an example of an embodiment of a remote material identification process for non-polarimetric reflective imagery.
Figure 7:
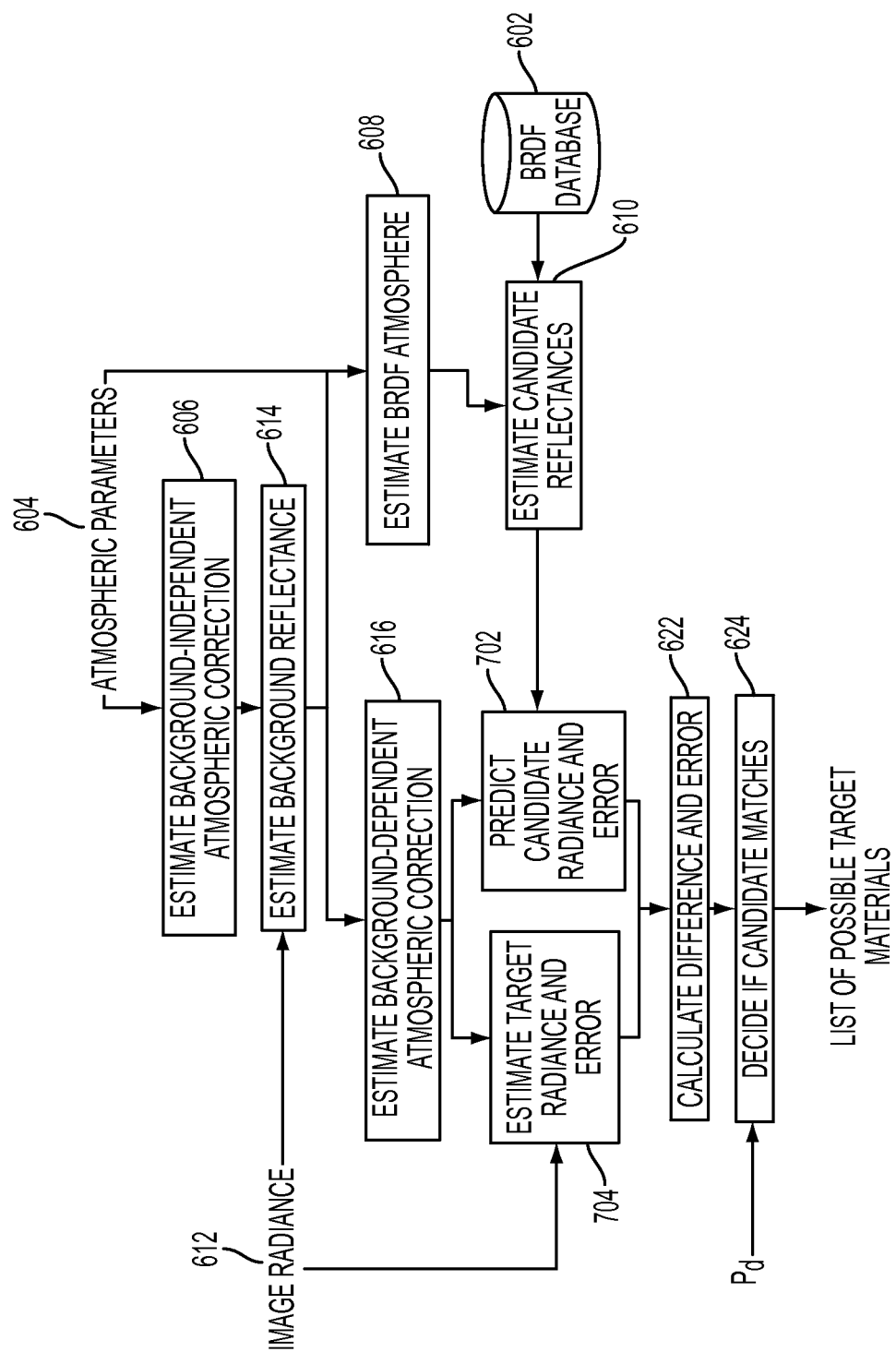
FIG. 7 is a second example of an embodiment of a remote material identification process for non-polarimetric reflective imagery.

FIGS. 6 and 7 illustrate two examples of implementation of the process of FIG. 2 for non-polarimetric reflective imagery which are performed on one or more specially programmed computers. The reflective imagery may be a single band, multispectral or hyperspectral. These examples assume multispectral imagery. Non-polarimetric hyperspectral imagery is processed in a substantially similar manner. FIG. 6 is an example of performing the process in the reflectance domain, and FIG. 7 is an example of performing the process in the radiance domain.

Each process uses target radiance from at least two images. The images are generated using at least one radiometrically calibrated non-polarimetric multispectral sensor. The images are acquired at two or more acquisition geometries, as generally shown in FIG. 1A. In the following example, at least one image is acquired near the specular geometry and one acquired far from the specular geometry, and the target is assumed to be a non-Lambertian material.

For each image, each of these examples utilizes the following inputs: target radiance; background radiance; the relative spectral response function for each band in the images data set; information about the atmosphere through which the target was illuminated by radiation and through which the reflected radiation was sensed; candidate material surface properties; and uncertainties.

Information about the atmosphere includes the effective aerosol parameters for each aerosol regime, primarily the boundary layer, the troposphere and the stratosphere, as well as other atmospheric parameters and their uncertainty, for example, water vapor column abundance. Examples of the aerosol parameters include effective extinction, absorption and asymmetry parameters for an assumed layer thickness, and an associated error covariance matrix. One or more of the parameters can be used. Total column amounts are usually sufficient; vertical profiles are not necessary. The background radiance is used to derive background reflectance. Candidate material surface properties include diffuse reflectance and Lambertian-equivalent solar reflectance. They can be obtained from the BRDF database 602, such as through the NEF data system. Uncertainty inputs include radiance measurement uncertainty, error covariance matrix for the diffuse reflectance and Lambertian-equivalent solar reflectance, aerosol parameter uncertainty, and spectral calibration uncertainty for hyperspectral sensor imagery.

The following steps are performed by one or more specially programmed computing systems for each image that is being used in the identification process. Aerosol parameters 604 are used at step 606 to estimate background independent atmospheric correction for each image. The aerosol parameters are also used to estimate a "BRDF atmosphere" at 608, i.e. the transmittance and downwelling radiance incident on the target, for use in estimating each candidate reflectance at step 610, under the given atmospheric conditions, using surface reflection parameters for the candidate material obtained from BRDF database 602. The estimated background independent atmospheric correction and the radiance of the image 612 are used to determine an estimate of background reflectance at step 614. The background independent path terms 606 and the estimated background reflectance from step 614 are then used at step 616 to determine an estimate of the background dependent atmospheric correction for use in the determination of at least the candidate spectral signatures. For the reflectance domain process shown in FIG. 6, this atmospheric correction is used to determine a predicted candidate reflectance and error at step 618 and an estimate target reflectance error at step 620 using the radiance from the image radiance 612 of the target. For the radiance domain process of FIG. 7, the estimated background dependent atmospheric correction is used at step 702 to predict the radiance of each candidate material using the estimated candidate reflectance from step 610. The target radiance signature and error is estimated at step 704 from the image radiance 612. The atmospheric conditions do not need to be taken into account when estimating a target radiance signature.

Referring now to both FIGS. 6 and 7, the estimated target reflectance and the predicted candidate reflectance for an image constitute, respectively, target and candidate signatures for the reflectance domain. Similarly, the estimated target radiance and predicted candidate radiance constitute, respectively, target and candidate spectral signatures for the radiance domain. Target signatures from multiple images are concatenated, as are candidate signatures for each acquisition angle, for comparison. Differences between the target and candidate signatures and error covariance are calculated at step 622. A chi-square test is performed to determine whether the difference is small enough to declare that the candidate material is a possible match at step 624. The chi-square test is just one example of a test for determining whether there is a match.

Additional details of exemplary methods useful for performing various steps of the foregoing processes are given below, and in the sections that follow. Some of these methods, or substantially similar methods, can be adapted, as necessary, for use for certain steps in the implementation of the material identification process of FIG. 2 for other imaging modalities, which are described below in connection with FIGS. 8-13. All of the methods are carried out by programs executing on computing systems. Bold-faced characters indicate vectors.

The aerosol parameters in this example consist of extinction coefficients $\hat{\epsilon}=\hat{\epsilon}_\lambda$, absorption coefficients $\hat{\alpha}=\hat{\alpha}_\lambda$, and asymmetry parameters $\hat{\psi}=\hat{\psi}_\lambda$, and are first used at step 606 to estimate a set of nominal BIP (background-independent path) terms and three additional sets corresponding to error perturbations $\delta\epsilon$, $\delta\alpha$ and $\delta\psi$ in $\hat{\epsilon}$, $\hat{\alpha}$ and $\hat{\psi}$. The four sets of BIP terms are denoted $\bar{B}IP[4]=\{\bar{B}IP,\bar{B}IP(\delta\epsilon), \bar{B}IP(\delta\alpha), \bar{B}IP(\delta\psi)\}$. The $\bar{B}IP[4]$ terms comprise the estimated background independent atmospheric correction. These are used with the background radiance $L^b$ to estimate the nominal band-integrated background reflectance at step 614 and four perturbations denoted $\hat{\rho}^b[5]=\{\hat{\rho}^b,\hat{\rho}^b(\delta\epsilon),\hat{\rho}^b(\delta\alpha),\hat{\rho}^b(\delta\psi),\hat{\rho}^b(\delta L^b)\}$. The B̂IP[4] and $\hat{\rho}^b[5]$ terms are then used at step 616 to estimate one set of nominal BDP (background-dependent path) terms and four additional sets B̂DP[5]= {B̂DP, B̂DP($\delta\epsilon$), B̂DP($\delta\alpha$), B̂DP($\delta\psi$), B̂DP($\delta L^b$)}.

The B̂DP[5] terms and the target radiance are then used at step 620 to estimate the band-integrated Lambertian-equivalent target reflectance spectrum in each image and their perturbations, denoted by $\hat{\rho}^t[5]=\{\hat{\rho}^t,\hat{\rho}^t(\delta\epsilon),\hat{\rho}^t(\delta\alpha),\hat{\rho}^t(\delta\psi),\hat{\rho}^t(\delta L^b)\}$.

The estimated aerosol parameters and background reflectance values $\hat{\rho}^b[5]$ are also used at step 608 to estimate one set of nominal NEF atmosphere parameters and four error perturbations denoted by ÂTM[5]={ÂTM, ÂTM ($\delta\epsilon$), ÂTM ($\delta\alpha$), ÂTM ($\delta\psi$), ÂTM ($\delta L^b$)}. The ÂTM[5] terms are then used at step 610 to estimate the nominal candidate hemispherical directional reflectance and four error perturbations, $\hat{\rho}_D{}^c[5]=\{\hat{\rho}_D{}^c, \hat{\rho}_D{}^c(\delta\epsilon), \hat{\rho}_D{}^c(\delta\alpha), \hat{\rho}_D{}^c(\delta\psi), \hat{\rho}_D{}^c(\delta L^b)\}$, and the nominal Lambertian-equivalent solar reflectances and four error perturbations $\hat{\rho}_{SL}{}^c[5]=\{\hat{\rho}_{SL}{}^c,\hat{\rho}_{SL}{}^c(\delta\epsilon),\hat{\rho}_{SL}{}^c(\delta\alpha),\hat{\rho}_{SL}{}^c(\delta\psi),\hat{\rho}_{SL}{}^c(\delta L^b)\}$ The $\hat{\rho}_D{}^c[5]$, $\hat{\rho}_{SL}{}^c[5]$ and B̂DP[5] terms are used to predict at step 618 the band-integrated Lambertian-equivalent reflectance spectrum and four error perturbations $\hat{\rho}^c[5]=\{\hat{\rho}^c, \hat{\rho}^c(\delta\epsilon), \hat{\rho}^c(\delta\alpha), \hat{\rho}^c(\delta\psi), \hat{\rho}^c(\delta L^b)\}$ of a NEF candidate material from BRDF database 602, for each image acquisition geometry.

The $\hat{\rho}^t[5]$ and $\hat{\rho}^c[5]$ terms are used at step 622 to estimate the difference spectrum $\xi=\hat{\rho}^t-\hat{\rho}^c$ and four error perturbations $\xi[5]=\{\xi,\xi(\delta\epsilon),\xi(\delta\alpha),\xi(\delta\psi),\xi(\delta L^b)\}$. The perturbations are used to calculate the uncertainty in $\hat{\rho}^t-\hat{\rho}^c$ attributable to errors in $\epsilon$, $\alpha$, $\psi$ and $L^b$. The uncertainty attributable to errors in target radiance is also calculated, but an error perturbation is not required because the error does not affect the candidate reflectance. Consequently, the analytical approach is used to evaluate this term. The uncertainty associated with errors in the NEF measurements are also calculated, but the analytical approach is used because these errors do not affect the calculation of the target reflectance.

The difference spectra are concatenated into a multi-angle signature, an example of which is shown below, and the error covariance of this signature is calculated for using in assessing the differences at step 622. A chi-square test is performed at step 624 to determine whether the differences are small enough to declare that the candidate material is a possible match. Other tests could be used.

$$\hat{\epsilon}, \hat{\alpha}, \hat{\psi} \rightarrow \hat{B}IP, \hat{B}IP(\delta\epsilon), \hat{B}IP(\delta\alpha), \hat{B}IP(\delta\psi) \quad (4)$$

$$\hat{L}^b \xrightarrow{\hat{B}IP[4]} \hat{\rho}^b, \hat{\rho}^b(\delta\epsilon), \hat{\rho}^b(\delta\alpha), \hat{\rho}^b(\delta\psi), \hat{\rho}^b(\delta L^b)$$

$$\hat{B}IP[4] \xrightarrow{\hat{\rho}^b[5]} \hat{B}DP, \hat{B}DP(\delta\epsilon), \hat{B}DP(\delta\alpha), \hat{B}DP(\delta\psi), \hat{B}DP(\delta L^b)$$

$$\hat{\epsilon}, \hat{\alpha}, \hat{\psi}, \hat{\rho}^b[5] \rightarrow \hat{A}TM, \hat{A}TM(\delta\epsilon), \hat{A}TM(\delta\alpha), \hat{A}TM(\delta\psi), \hat{A}TM(\delta L^b)$$

$$\hat{L}^t \xrightarrow{\hat{A}DP[5]} \hat{\rho}^t, \hat{\rho}^t(\delta\epsilon), \hat{\rho}^t(\delta\alpha), \hat{\rho}^t(\delta\psi), \hat{\rho}^t(\delta L^b)$$

$$\rho_D^c[5], \rho_{SL}^c[5] \xrightarrow{\hat{B}DP[5]} \hat{\rho}^c, \hat{\rho}^c(\delta\epsilon), \hat{\rho}^c(\delta\alpha), \hat{\rho}^c(\delta\psi), \hat{\rho}^c(\delta L^b)$$

$$\hat{\rho}^t[5], \hat{\rho}^c[5] \rightarrow \xi, \xi(\delta\epsilon), \xi(\delta\alpha), \xi(\delta\psi), \xi(\delta L^b)$$

Aerosol Characterization

The aerosol parameters 604 used to estimate the background independent atmospheric correction at step 606 and the BRDF atmosphere at step 608 are obtained as follows. The MODTRAN® computer program for modeling atmospheric propagation of electromagnetic radiation contains built in aerosol types. However, in the methods disclosed herein, the effects are preferably characterized using AERONET (Aerosol Robotic Network) aerosol parameters instead of the aerosol types built into the MODTRAN® program. A cluster analysis study[1] of AERONET data showed that there are effectively six (6) types of aerosols. The study report listed single scattering albedo ssa(0.673), extinction coefficient ext (0.673) and asymmetry parameters asym(0.673) at 673 nm. Data at the other three AERONET wavelengths were obtained from the senior author of the study. These data are listed in Table 2.

[1] Omar, et al., "Development of global aerosol models using cluster of Aerosol Robotic Network (AERONET) measurements", JGR, vol. 110, March 2005

TABLE 2

|  | Type 1: Desert Dust | Type 2: Biomass Burning | Type 3: Rural (Background) | Type 4: Industrial Pollution | Type 5: Polluted Marine | Type 6: Dirty Pollution |
|---|---|---|---|---|---|---|
| Single scattering albedo @ 441 nm | 0.923452 | 0.841479 | 0.906909 | 0.937582 | 0.931900 | 0.752894 |
| Single scattering albedo @ 673 nm | 0.927965 | 0.800305 | 0.877481 | 0.921652 | 0.925049 | 0.717840 |
| Single scattering albedo @ 873 nm | 0.926163 | 0.765592 | 0.853717 | 0.905481 | 0.917595 | 0.667695 |
| Single scattering albedo @ 1022 nm | 0.927608 | 0.745263 | 0.846585 | 0.895503 | 0.910512 | 0.633196 |
| Extinction coefficient @ 441 nm | 0.406217 | 0.348215 | 0.067341 | 0.370811 | 0.194477 | 0.180477 |
| Extinction coefficient @ 673 nm | 0.326517 | 0.190405 | 0.035950 | 0.190634 | 0.139910 | 0.100125 |
| Extinction coefficient @ 873 nm | 0.291773 | 0.132512 | 0.025993 | 0.125879 | 0.114592 | 0.071986 |
| Extinction coefficient @ 1022 nm | 0.280223 | 0.111652 | 0.022831 | 0.101389 | 0.102874 | 0.063466 |
| Asymmetry factor @ 441 nm | 0.692541 | 0.664340 | 0.649253 | 0.694172 | 0.740076 | 0.679427 |
| Asymmetry factor @ 673 nm | 0.667937 | 0.603481 | 0.580048 | 0.611590 | 0.710529 | 0.594261 |
| Asymmetry factor @ 873 nm | 0.672450 | 0.582214 | 0.571153 | 0.574028 | 0.715632 | 0.571046 |
| Asymmetry factor @ 1022 nm | 0.673933 | 0.579726 | 0.574551 | 0.562794 | 0.714759 | 0.565743 |

In order to use the AERONET data in the MODTRAN® program for estimating the background independent atmospheric correction at step 606 and the BRDF atmosphere at step 608, the AERONET extinction coefficients ext($\lambda$) and single scattering albedos ssa($\lambda$) must first be converted into the MODTRAN normalized extinction coefficients $K_{ext}(\lambda)$ and normalized absorption coefficients $K_{abs}(\lambda)$. First the absorption coefficient abs($\lambda$) is derived from ext($\lambda$) and ssa ($\lambda$) in accordance with the last line of (1):

$$ext(\lambda) = abs(\lambda) + scatter(\lambda) \quad (1)$$
$$= abs(\lambda) + ext(\lambda) \cdot ssa(\lambda) \Rightarrow$$
$$abs(\lambda) = ext(\lambda)(1 - ssa(\lambda))$$

Next, the extinction coefficient at 0.55 microns is estimated by linear interpolation as in equation (2):

$$ext(0.550) = \frac{0.673 - 0.550}{0.673 - 0.441} ext(0.441) + \frac{0.550 - 0.441}{0.673 - 0.441} ext(0.673) \quad (2)$$

Finally, $K_{ext}(\lambda)$ and $K_{abs}(\lambda)$ are calculated as in equation (3):

$$K_{ext}(\lambda) = \frac{ext(\lambda)}{ext(0.550)} \quad (3)$$

$$K_{abs}(\lambda) = \frac{abs(\lambda)}{ext(0.550)}$$

Since no aerosol vertical profile information is available, and because the aerosol effects are only weakly influenced by aerosol vertical distribution, aerosol is modeled only in the boundary layer. Consequently, the AERONET aerosol parameters are incorporated into the MODTRAN card deck in the following way. For Card2, the 'ARUSS' field is set to 'USS' to indicate that user-defined aerosol properties will be read from Cards 2D, 2D1 and 2D2. For card2D, IREG(1) is set to 4, indicating that optical properties for the boundary layer aerosols will be given at 4 wavelengths. IREG(2), IREG(3) and IREG(4) are set to 0 indicating that no changes will be made to the other aerosol regimes. For Card2D1, AWCCON is set to blank. For Card2D2, two cards must be written, the first providing the aerosol optical properties for the given AERONET aerosol type at the first three AERONET wavelengths, and the second card at the fourth wavelength. Card2D2 #1 specifies, for each of the first three AERONET wavelengths in Table 6-1, the wavelength $\lambda$, in microns, $K_{est}(\lambda)$, $K_{abs}(\lambda)$ and the AERONET asymmetry factor asym($\lambda$). This card therefore has the contents: 0.441, $K_{est}(0.441)$, $K_{abs}(0.441)$, asym(0.441), 0.673, $K_{est}(0.673)$, $K_{abs}(0.673)$, asym (0.673), 0.873, $K_{est}(0.873)$, $K_{abs}(0.873)$, asym (0.873). The contents of Card2D2 #2, for the fourth AERONET wavelength in Table 6-1, include 1.022, $K_{est}(1.022)$, $K_{abs}(1.022)$ and asym(1.022).

From MODTRAN® or other atmospheric modeling program, the following estimated aerosol spectral parameters $\hat{\epsilon} = \hat{\epsilon}_\lambda$, $\hat{\alpha} = \hat{\alpha}_\lambda$ and $\hat{\psi} = \hat{\psi}_\lambda$ are obtained. It will be assumed for simplicity that errors in these parameters are zero-mean Gaussian random variables with known standard deviations that are proportional to the parameter value by factors $\sigma_{\delta\epsilon}$, $\sigma_{\delta\alpha}$ and $\sigma_{\delta\psi}$, which are the same in each band. It will also be assumed that these errors are independent parameter-to-parameter and band-to-band. The algorithm can be easily modified to accommodate errors that are correlated parameter-to-parameter and band-to-band if such correlation coefficients are available.

The target radiance signature $L^b$ and background radiance signature $L^t$ for each image are assumed to be provided from a multispectral sensor with $N_b$ bands. It will be assumed that errors in each component of these radiance measurements are zero-mean Gaussian random variables with standard deviations that are proportional to the radiance by a factor $\sigma_{cal}$. It will also be assumed that these errors are independent band-to-band and image-to-image.

Estimation of Spectral BIP Terms

The following is a description of one method for estimating spectral BIP terms.

The spectral BIP terms appropriate for the reflective region consist of, in this example, the following quantities indexed by wavenumber v. These quantities are calculated as functions of aerosol properties and acquisition geometry:

$L_v^{AS}$—Solar photons that are scattered into the sensor's field of view via single or multiple scatter events within the atmosphere without ever reaching the target or background.

$L_v^{DSR}$—Solar photons that pass directly through the atmosphere to a 100% reflectance Lambertian target, reflect off the target, and propagate directly through the atmosphere to the sensor. Light for this path term is attenuated by absorption and by light scattering out of the path, but no radiance is scattered into the path. This path does not involve any interaction with the background.

$L_v^{SSR}$—Solar photons that are scattered by the atmosphere onto a 100% reflectance Lambertian target, reflect off the target, and propagate directly through the atmosphere to the sensor. This path term does not involve any interactions with the background.

$L_v^{BDSR}$—Solar photons that are directly transmitted to a 100% reflectance Lambertian background, reflect off the background once, and then scatter into the field of view of the sensor.

$L_v^{BSSR}$—Solar photons that are scattered by the atmosphere at least once, reflect off a 100% reflectance Lambertian background once, and then scatter into the field of view of the sensor.

$S_v$—Spherical albedo of the bottom of the atmosphere, which can be thought of as a reflection coefficient of the atmosphere.

The spectral BIP terms can be used to calculate the spectral target radiance $L_v$ as shown in equation (5), where $\rho_v^t$ is the NEF spectral AEV of the target reflectance and $\rho_v^b$ is the spectral AEV of the background reflectance.

$$L_v = \rho_v^{SL} L_v^{DSR} + \qquad \ldots \text{target reflected solar radiance} \quad (5)$$

$$\frac{\rho_v^D}{1 - \rho_v^b S_v}(\rho_v^b S_v L_v^{DSR} + L_v^{SSR}) + \quad \ldots \text{target scattered downwell}$$

$$L_v^{AS} + \frac{\rho_v^b}{1 - \rho_v^b S_v}(L_v^{BDSR} + L_v^{BSSR}) \quad \ldots \text{atmospheric \& background scatter}$$

Instead of the preceding equation, the following, faster band integrated version given in equation (6) can be used:

$$L_i^t = \rho_i^{SL} L_i^{TRDS} + \rho_i^D L_i^{TRH} + L_i^{PSMS} \quad (6)$$

Three additional sets of spectral BIP terms are calculated, one for each of the sets of aerosol parameters $(\epsilon + \Delta\epsilon, \alpha, \psi)$ $(\epsilon, \alpha + \Delta\alpha, \psi)$ and $(\epsilon, \alpha, \psi + \Delta\psi)$, where $\Delta\epsilon$, $\Delta\alpha$ and $\Delta\psi$ are small perturbations. These perturbed terms are used to calculate. Contributions to the uncertainty in the estimated background reflectance attributable to errors in $\epsilon$, $\alpha$ and $\psi$ and contributions to the uncertainty of the band-integrated BDP terms, as explained below.

The ordering of the estimated spectral BIP terms $\vec{\text{BIP}}[4]$ is shown in equation (7):

$\vec{\text{BIP}}[0] = \text{BIP}(\hat{\epsilon}, \hat{\alpha}, \hat{\psi}) \ldots$ nominal BIP terms $\vec{\text{BIP}}[1] = \text{BIP}(\hat{\epsilon} + \Delta\epsilon, \hat{\alpha}, \hat{\psi}) \ldots$ extinction perturbation $\vec{\text{BIP}}[2] = \text{BIP}(\hat{\epsilon}, \hat{\alpha} + \Delta\alpha, \hat{\psi}) \ldots$ absorption perturbation $\vec{\text{BIP}}[3] = \text{BIP}(\hat{\epsilon}, \hat{\alpha}, \hat{\psi} + \Delta\psi) \ldots$ asymmetry perturbation  (7)

A function $\hat{\rho}^b(\epsilon, \alpha, \psi, L^b)$ will be implicitly defined which estimates the band-effective Lambertian-equivalent background reflectance $\hat{\rho}_i^b = \hat{\rho}(\epsilon_i, \alpha_i, \psi_i, L_i^b)$ in band i. Since the calculations are the same in each band, the band index will be dropped in the following equations. First, define the forward model function $L(\rho^b)$ by equation (8), which gives the background radiance for a given background reflectance $\rho^b$ and spectral BIP terms calculated from aerosol parameters $\epsilon$, $\alpha$ and $\psi$:

$$L(\rho^b) = \int \left[ L_v^{AS} + \frac{\rho^b}{1 - \rho^b S_v} (L_v^{DSR} + L_v^{SSR} + L_v^{BDSR} + L_v^{BSSR}) \right] R_v dv \quad (8)$$

The estimated background reflectance is the value $\hat{\rho}^b$ that solves equation (9).

$$L(\hat{\rho}^b) = \hat{L}^b \quad (9)$$

Equation (9) therefore defines the desired function $\hat{\rho}^b(L^b, \epsilon, \alpha, \psi)$ by the implicit function theorem. Since equation (9) is non-linear in $\hat{\rho}^b$, it is solved by applying the Newton-Raphson method to equation (10):

$$F(\hat{\rho}^b) = L(\hat{\rho}^b) - \hat{L}^b = 0 \quad (10)$$

The derivative of F required by the Newton-Raphson method is given in equation (11):

$$F'(\rho^b) = \frac{\partial L}{\partial \rho^b} \quad (11)$$
$$= \int \frac{1}{(1 - \rho^b S_v)^2} (L_v^{DSR} + L_v^{SSR} + L_v^{BDSR} + L_v^{BSSR}) R_v dv$$

The background reflectance and its perturbations $\hat{\rho}^b[5]$ corresponding to perturbations $\Delta\epsilon$, $\Delta\alpha$, $\Delta\psi$ and $\Delta L^b$ are calculated for use in calculating the perturbed BDP terms and NEF atmospheres. The notation and ordering are shown in equation (12):

$$\hat{\rho}^b[0] = \rho^b(\text{BIP}[0], \hat{L}^b) \ldots \text{nominal reflectance}$$
$$\hat{\rho}^b[1] = \rho^b(\text{BIP}[1], \hat{L}^b) \ldots \text{extinction perturbation}$$
$$\hat{\rho}^b[2] = \rho^b(\text{BIP}[2], \hat{L}^b) \ldots \text{absorption perturbation}$$
$$\hat{\rho}^b[3] = \rho^b(\text{BIP}[3], \hat{L}^b) \ldots \text{asymmetry perturbation}$$
$$\hat{\rho}^b[4] = \rho^b(\text{BIP}[0], \hat{L}^b + \Delta L^b) \ldots \text{background radiance perturbation} \quad (12)$$

Estimation of Background Reflectance

Following is a description of one example of a method for estimating background reflectance in an image.

The uncertainty contributions to background reflectance corresponding to errors $\Delta\epsilon$, $\Delta\alpha$, $\Delta\psi$ and $\Delta L^b$ are calculated as in equation (13):

$$\delta\hat{\rho}^b[0] = \hat{\rho}^b[1] - \hat{\rho}^b[0] \ldots \text{extinction error}$$
$$\delta\hat{\rho}^b[1] = \hat{\rho}^b[2] - \hat{\rho}^b[0] \ldots \text{absorption error}$$
$$\delta\hat{\rho}^b[2] = \hat{\rho}^b[3] - \hat{\rho}^b[0] \ldots \text{asymmetry error}$$
$$\delta\hat{\rho}^b[3] = \hat{\rho}^b[4] - \hat{\rho}^b[0] \ldots \text{background radiance error} \quad (13)$$

The standard deviation $\sigma_{\delta\hat{\rho}^b, \delta\epsilon}$ of the error in $\hat{\rho}^b$ attributable to errors in $\epsilon$ is derived in equation (14). It is assumed that the standard deviation $\sigma_{\delta\epsilon}$ of errors in $\epsilon$ is available from the provider of the aerosol parameters. The last two equations in (14) for $\sigma_{\delta\hat{\rho}^b, \delta\alpha}$ and $\sigma_{\delta\hat{\rho}^b, \delta\psi}$ are derived similarly.

$$\sigma_{\delta\hat{\rho}^b, \delta\epsilon} = \frac{\partial \hat{\rho}^b}{\partial \epsilon} \sigma_{\delta\epsilon} \quad (14)$$
$$\approx [\hat{\rho}^b(\epsilon + \Delta\epsilon) - \hat{\rho}^b(\epsilon)] \frac{\sigma_{\delta\epsilon}}{\Delta\epsilon}$$
$$= \delta\hat{\rho}^b[0] \frac{\sigma_{\delta\epsilon}}{\Delta\epsilon} \quad \ldots \text{extinction contribution}$$

$$\sigma_{\delta\hat{\rho}^b, \delta\alpha} \approx [\hat{\rho}^b(\alpha + \Delta\alpha) - \hat{\rho}^b(\alpha)] \frac{\sigma_{\delta\alpha}}{\Delta\alpha} \quad \ldots \text{absorption contribution}$$

$$\sigma_{\delta\hat{\rho}^b, \delta\psi} \approx [\hat{\rho}^b(\psi + \Delta\psi) - \hat{\rho}^b(\psi)] \frac{\sigma_{\delta\psi}}{\Delta\psi} \quad \ldots \text{asymmetry contribution}$$

Equation (14) is evaluated as shown in the following equation (15):

$$\sigma_{\delta\hat{\rho}^b, \delta\epsilon} \approx \delta\hat{\rho}^b[0] \frac{\sigma_{\delta\epsilon}}{\Delta\epsilon} \quad \ldots \text{extinction contribution} \quad (15)$$

$$\sigma_{\delta\hat{\rho}^b, \delta\epsilon} \approx \delta\hat{\rho}^b[1] \frac{\sigma_{\delta\alpha}}{\Delta\alpha} \quad \ldots \text{absorption contribution}$$

$$\sigma_{\delta\hat{\rho}^b, \delta\psi} \approx \delta\hat{\rho}^b[2] \frac{\sigma_{\delta\psi}}{\Delta\psi} \quad \ldots \text{asymmetry contribution}$$

The standard deviation $\sigma_{\delta\hat{\rho}^b, \delta L^b}$ of the error $\hat{\rho}^b$ in attributable to errors in $L^b$ is derived in equation (16). The second equality follows from the characterization of the standard deviation of radiance errors as a fraction $\sigma_{cal}$ of the radiance, and the third equality expresses the answer in terms of $$\frac{\partial L^b}{\partial \hat{\rho}^b},$$

which is given by equation (16) evaluated at $\hat{\rho}^b$:

$$\sigma_{\delta\hat{\rho}^b, \delta L^b} = \frac{\partial \hat{\rho}^b}{\partial L^b} \sigma_{\delta L^b} \quad (16)$$
$$= \frac{\partial \hat{\rho}^b}{\partial L^b} \sigma_{cal} L^b$$
$$= \frac{L^b}{\left( \frac{\partial L^b}{\partial \hat{\rho}^b} \right)} \sigma_{cal}$$

The standard deviation $\sigma_{\delta\hat{\rho}^b}$ of the errors in $\hat{\rho}^b$ is obtained by combining the standard deviations of the individual contributors in quadrature as in equation (17), because the errors are assumed to be independent.

$$\sigma_{\delta\hat{\rho}^b} = \sqrt{\sigma_{\delta\hat{\rho}^b, \delta L^b}^2 + \sigma_{\delta\hat{\rho}^b, \delta\epsilon}^2 + \sigma_{\delta\hat{\rho}^b, \delta\alpha}^2 + \sigma_{\delta\hat{\rho}^b, \delta\psi}^2} \quad (17)$$

Estimate of Band-Integrated BDP Terms

Following is a description of one method for estimating band-integrated BDP terms.

The estimated band-integrated BDP terms $\bar{B}DP$ are calculated from the estimated spectral BIP terms $\bar{B}IP$ and the estimated band-effective background reflectance $\hat{\rho}_i^b$ as shown in equation (18).

$$\hat{L}_i^{TRDS} = \int \hat{L}_v^{DSR} R_i(v) dv \qquad (18)$$

$$\hat{L}_i^{TRH} = \int \frac{1}{1-\hat{\rho}_i^b \hat{S}_v}(\hat{\rho}_i^b \hat{S}_v \hat{L}_v^{DSR} + \hat{L}_v^{SSR}) R_i(v) dv$$

$$\hat{L}_i^{PSMS} = \int \left[\hat{L}_v^{AS} + \frac{\hat{\rho}_i^b}{1-\hat{\rho}_i^b \hat{S}_v}(\hat{L}_v^{BDSR} + \hat{L}_v^{BSSR})\right] R_i(v) dv$$

Equation (19) will be expressed as $\bar{B}DP = BDP(\bar{B}IP, \hat{\rho}^b)$ where the terms $\hat{L}^{DSR}$, $\hat{L}^{SSR}$, $\hat{L}^{AS}$, $\hat{L}^{BDSR}$, $\hat{L}^{BSSR}$, $\hat{S}^{DSR}$ and R are obtained directly from the BIP structure.

Four additional sets of band-integrated BDP terms are calculated, three corresponding to the aerosol perturbations $\Delta\epsilon$, $\Delta\alpha$, $\Delta\psi$ and the accompanying background reflectance perturbations $\hat{\rho}^b(\epsilon+\Delta\epsilon,\alpha,\psi,L^b)$, $\hat{\rho}^b(\epsilon,\alpha+\Delta\alpha,\psi,L^b)$, $\hat{\rho}^b(\epsilon,\alpha,\psi+\Delta\psi,L^b)$, and one corresponding to the background radiance perturbation $\hat{\rho}^b(\epsilon,\alpha,\psi,L^b+\Delta L^b)$. The ordering is shown in equation (19):

$\bar{B}DP[0] = BDP(\bar{B}IP[0],\hat{\rho}^b[0])$ ... nominal BDP terms $\bar{B}DP[1] = BDP(\bar{B}IP[1],\hat{\rho}^b[1])$ ... extinction perturbation $\bar{B}DP[2] = BDP(\bar{B}IP[2],\hat{\rho}^b[2])$ ... absorption perturbation $\bar{B}DP[3] = BDP(\bar{B}IP[3],\hat{\rho}^b[3])$ ... asymmetry perturbation $\bar{B}DP[4] = BDP(\bar{B}IP[0],\hat{\rho}^b[4])$ ... background radiance perturbation  (19)

Estimating BRDF Atmosphere

The following method is an example of estimating a "BRDF atmosphere", which comprises atmospheric transmittances and downwelling radiance. The BRDF atmosphere is used by the NEFDS to predicted candidate reflectance signatures. The following example assumes that the target surface is horizontal.

The estimated NEF atmosphere terms $\bar{N}TM$ are calculated from the estimated aerosol parameters $\hat{\epsilon}$, $\hat{\alpha}$ and $\hat{\psi}$, and from the estimated background reflectance $\hat{\rho}^b$. The process will be denoted $\bar{N}TM = ATM(\hat{\epsilon}, \hat{\alpha}, \hat{\psi}, \hat{\rho}^b)$. Four additional sets of NEF atmosphere terms are also calculated, three corresponding to the aerosol perturbations $\Delta\epsilon$, $\Delta\alpha$, $\Delta\psi$ and accompanying background reflectance perturbations $\hat{\rho}^b[1] = \hat{\rho}^b(\epsilon+\Delta\epsilon,\alpha,\psi,L^b)$, $\hat{\rho}^b[2] = \hat{\rho}^b(\epsilon,\alpha+\Delta\alpha,\psi,L^b)$, $\hat{\rho}^b[3] = \hat{\rho}^b(\epsilon,\alpha,\psi+\Delta\psi,L^b)$, and one corresponding to a perturbation of the background radiance $\hat{\rho}^b[4] = \hat{\rho}^b(\epsilon,\alpha,\psi,L^b+\Delta L^b)$. These perturbed terms are used to calculate derivatives of the NEF directional hemispherical reflectance and Lambertian-equivalent solar reflectance AEVs. The ordering is shown in equation (20):

$\bar{N}TM[0] = ATM(\hat{\epsilon},\hat{\alpha},\hat{\psi},\hat{\rho}^b[0])$ ... nominal BDP terms $\bar{N}TM[1] = ATM(\hat{\epsilon}+\Delta\epsilon,\hat{\alpha},\hat{\psi},\hat{\rho}^b[1])$ ... extinction perturbation $\bar{N}TM[2] = ATM(\hat{\epsilon},\hat{\alpha}+\Delta\hat{\alpha},\hat{\psi},\hat{\rho}^b[2])$ ... absorption perturbation $\bar{N}TM[3] = ATM(\hat{\epsilon},\hat{\alpha},\hat{\psi}+\Delta\hat{\psi},\hat{\rho}^b[3])$ ... asymmetry perturbation $\bar{N}TM[4] = ATM(\hat{\epsilon},\hat{\alpha},\hat{\psi},\hat{\rho}^b[4])$ ... background radiance perturbation  (20)

Estimation of Target Reflectance

The following method is an example for estimating target reflectance with the process of FIG. 6, as well as material identification processes for different imaging modalities that require estimation of target reflectance from a radiance measurement. This example assumes that the orientation of the target surface is horizontal.

The band-effective Lambertian-equivalent target reflectance $\rho_i^t$ in band i is estimated using equation (21), where the second line follows from the Lambertian-equivalent assumption $\rho_i^{SL} = \rho_i^D = \rho_i^t$:

$$L_i^t = \rho_i^{SL} L_i^{TRDS} + \rho_i^D L_i^{TRH} + L_i^{PSMS} \qquad (21)$$

$$= \rho_i^t (L_i^{TRDS} + L_i^{TRH}) + L_i^{PSMS}$$

Equation (21) is now solved for $\rho_i^t$ as in equation (22), where $\hat{L}^s = \hat{L}^{PSMS}$ is the radiance scattered by the atmosphere and background, and $\hat{L}^r = \hat{L}^{TRDS} + \hat{L}^{TRH}$ is the radiance reflected by a perfect Lambertian reflector.

$$\hat{\rho}^t = \frac{\hat{L}^t - \hat{L}^s}{\hat{L}^r} \qquad (22)$$

Equation (22) will be expressed as $\hat{\rho}^t = \rho^t(\bar{B}DP)$, where $\hat{L}^s$ and $\hat{L}^r$ are calculated from the $\bar{B}DP$ terms $\hat{L}^{PSMS}$, $\hat{L}^{TRDS}$ and $\hat{L}^{TRH}$ as explained above.

Four additional reflectance perturbations are also calculated as in equation (23), corresponding to the three perturbations of the band-integrated BDP terms and the perturbation in the background radiance. These perturbations will be used to calculate the correlated error in the delta reflectance and uncertainty as described below.

$\hat{\rho}^t[0] = \rho^t(\bar{B}DP[0])$ ... nominal reflectance $\hat{\rho}^t[1] = \rho^t(\bar{B}DP[1])$ ... extinction perturbation $\hat{\rho}^t[2] = \rho^t(\bar{B}DP[2])$ ... absorption perturbation $\hat{\rho}^t[3] = \rho^t(\bar{B}DP[3])$ ... asymmetry perturbation $\hat{\rho}^t[4] = \rho^t(\bar{B}DP[4])$ ... background radiance perturbation  (23)

The uncertainty contributions to target reflectance corresponding to errors $\Delta\epsilon$, $\Delta\alpha$, $\Delta\psi$ and $\Delta L^b$ are calculated as in equation (24):

$\delta\hat{\rho}^t[0] = \hat{\rho}^t[1] - \hat{\rho}^t[0]$ ... extinction error $\delta\hat{\rho}^t[1] = \hat{\rho}^t[2] - \hat{\rho}^t[0]$ ... absorption error $\delta\hat{\rho}^t[2] = \hat{\rho}^t[3] - \hat{\rho}^t[0]$ ... asymmetry error $\delta\hat{\rho}^t[3] = \hat{\rho}^t[4] - \hat{\rho}^t[0]$ ... background radiance error  (24)

The uncertainty contribution from target radiance errors is calculated as in equation (25). The first equality follows from first-order error propagation. The first term in the second equality is obtained by differentiating equation (22), and the second term follows from the characterization of radiance error as a percentage $\sigma_{cal}$ of the radiance:

$$\sigma_{\delta\hat{\rho}^t,\delta L^t} = \left|\frac{\partial \hat{\rho}^t}{\partial L^t}\right|\sigma_{\delta L^t} \qquad (25)$$

$$= \left|-\frac{1}{L^r}\right|\sigma_{cal}L^t$$

$$= \sigma_{cal}\frac{L^t}{L^r}$$

Estimation of Candidate Reflectance

For the process described herein, such as those of FIGS. 6 and 7, the band-effective Lambertian-equivalent reflectance for a candidate material can be calculated as shown in equation (26), where $\hat{\rho}^D$ is the estimated AEV directional hemispherical reflectance and $\hat{\rho}^{SL}$ is the estimated AEV Lambertian-equivalent solar reflectance calculated by the NEF using the estimated NEF atmosphere.

$$\hat{\rho}^c = \frac{\hat{L}^{TRH}}{\hat{L}^{TRH} + \hat{L}^{TRDS}}\hat{\rho}^D + \frac{\hat{L}^{TRDS}}{\hat{L}^{TRH} + \hat{L}^{TRDS}}\hat{\rho}^{SL} \qquad (26)$$

$$= \hat{f}\cdot\hat{\rho}^D + (1-\hat{f})\cdot\hat{\rho}^{SL}$$

Equation (26) will be expressed as $\hat{\rho}^c = \rho^c(\mathbf{B} DP, \hat{\rho}^D, \hat{\rho}^{SL})$, where $\hat{f}$ is calculated from the BDP terms $L^{TRH}$ and $L^{TRDS}$ as explained above.

Four additional reflectance perturbations are also calculated as in equation (27), corresponding to the three perturbations of the band-integrated BDP terms and a perturbation in the background reflectance. These perturbation will be used to calculate the correlated error in the delta reflectance.

$\hat{\rho}^c[0] = \rho^c(\mathbf{B} DP[0], \hat{\rho}_D^c[0], \hat{\rho}_{SL}^c[0])$ ... nominal reflectance $\hat{\rho}^c[1] = \rho^c(\mathbf{B} DP[1], \hat{\rho}_D^c[1], \hat{\rho}_{SL}^c[1])$ ... extinction perturbation $\hat{\rho}^c[2] = \rho^c(\mathbf{B} DP[2], \hat{\rho}_D^c[2], \hat{\rho}_{SL}^c[2])$ ... absorption perturbation $\hat{\rho}^c[3] = \rho^c(\mathbf{B} DP[3], \hat{\rho}_D^c[3], \hat{\rho}_{SL}^c[3])$ ... asymmetry perturbation $\hat{\rho}^c[4] = \rho^c(\mathbf{B} DP[4], \hat{\rho}_D^c[4], \hat{\rho}_{SL}^c[4])$ ... background radiance perturbation (27)

The uncertainty contributions to candidate reflectance corresponding to errors $\Delta\epsilon$, $\Delta\alpha$, $\Delta\psi$ and $\Delta L^b$ are calculated as in equation (28):

$\delta\hat{\rho}^c[0] = \hat{\rho}^c[1] - \hat{\rho}^c[0]$ ... extinction error $\delta\hat{\rho}^c[1] = \hat{\rho}^c[2] - \hat{\rho}^c[0]$ ... absorption error $\delta\hat{\rho}^c[2] = \hat{\rho}^c[3] - \hat{\rho}^c[0]$ ... asymmetry error $\delta\hat{\rho}^c[3] = \hat{\rho}^c[4] - \hat{\rho}^c[0]$ ... background radiance error (28)

An uncertainty contribution attributable to NEF BRDF measurement errors is calculated in accordance with equation (29):

$$\sigma_{\delta\hat{\rho}^c,\delta\rho NEF} = \begin{bmatrix} \frac{\partial \hat{\rho}^c}{\partial \hat{\rho}^D} & \frac{\partial \hat{\rho}^c}{\partial \hat{\rho}^{SL}} \end{bmatrix} \begin{bmatrix} \sigma^2_{\rho^D} & \sigma_{\rho^D,\rho^{SL}} \\ \sigma_{\rho^{SL},\rho^D} & \sigma^2_{\rho^{SL}} \end{bmatrix} \begin{bmatrix} \frac{\partial \hat{\rho}^c}{\partial \hat{\rho}^D} \\ \frac{\partial \hat{\rho}^c}{\partial \hat{\rho}^{SL}} \end{bmatrix} \qquad (29)$$

$$= \begin{bmatrix} \hat{f} & 1-\hat{f} \end{bmatrix} \begin{bmatrix} \sigma^2_{\rho^D} & \sigma_{\rho^D,\rho^{SL}} \\ \sigma_{\rho^{SL},\rho^D} & \sigma^2_{\rho^{SL}} \end{bmatrix} \begin{bmatrix} \hat{f} \\ 1-\hat{f} \end{bmatrix}$$

$$= \hat{f}^2\sigma^2_{\rho^D} + 2\hat{f}(1-\hat{f})\sigma_{\rho^D,\rho^{SL}} + (1-\hat{f})^2\sigma^2_{\rho^{SL}}$$

Delta Reflectance and Uncertainty

One method of performing step 622 of FIG. 6 is, as mentioned above, determining delta reflectance and uncertainty. One method for making this determination is described below. Similar methods can be used in connection with implementations for other imaging modalities described below.

Turning first to a step 622, for a single image case, start with $X_i = (\epsilon_i, \alpha_i, \psi_i, L_i^b)$, $X = (X_1 \ldots X_{N_b})$, $Y = (\rho_i^D, \rho_i^{SL})$ and $Y = (Y_1, \ldots, Y_{N_b})$. The delta reflectance spectrum is given by equation (30):

$$\xi = \xi(X, L^t, Y) \qquad (30)$$

$$= \hat{\rho}^t(X, L^t) - \hat{\rho}^c(X, Y)$$

Equation (30) implies that errors in $\hat{\rho}^t$ and $\hat{\rho}^c$ will be correlated through a common dependence on X. In the single image case, errors in X, $L^t$, and Y are independent. Writing the combined variables as $Z = (X, L^t, Y)$, it follows that $S_{\delta\xi} = \text{cov}(\delta\xi)$ is given by equation (31).

$$S_{\delta\xi} = \frac{\partial \xi}{\partial Z}\text{cov}(\delta Z)\frac{\partial \xi^T}{\partial Z} \qquad (31)$$

$$= \frac{\partial \xi}{\partial Z}\begin{bmatrix} \text{cov}(\delta X) & & \\ & \text{cov}(\delta L^t) & \\ & & \text{cov}(\delta Y) \end{bmatrix}\frac{\partial \xi^T}{\partial Z}$$

$$= \frac{\partial \xi}{\partial X}\text{cov}(\delta X)\frac{\partial \xi^T}{\partial X} + \frac{\partial \xi}{\partial L^t}\text{cov}(\delta L^t)\frac{\partial \xi^T}{\partial L^t} + \frac{\partial \xi}{\partial Y}\text{cov}(\delta Y)\frac{\partial \xi^T}{\partial Y}$$

$$= \frac{\partial \xi}{\partial X}\text{cov}(\delta X)\frac{\partial \xi^T}{\partial X} + \frac{\partial \hat{\rho}^t}{\partial L^t}\text{cov}(\delta L^t)\frac{\partial \hat{\rho}^{tT}}{\partial L^t} + \frac{\partial \hat{\rho}^c}{\partial Y}\text{cov}(\delta Y)\frac{\partial \hat{\rho}^{cT}}{\partial Y}$$

Equation (31) simplifies to the form shown in equation (32). The $$\frac{\partial \xi}{\partial X}$$

term is an $N_b \times N_b$ block diagonal matrix, one block per band, with 1×4 sub-blocks, because each depends only on $\epsilon_i$, $\alpha_i$, $\psi_i$, and $L_i^b$, and not on $\epsilon_j$, $\alpha_j$, $\psi_j$ or $L_j^b$ for $j \neq i$. The cov($\delta X$) term is an $N_b \times N_b$ block diagonal matrix with 4×4 sub-blocks because it is assumed that errors in X are independent band-to-band and parameter-to-parameter. Similarly, $$\frac{\partial \hat{\rho}^t}{\partial L^t}$$

and $cov(\delta L^t)$ are $N_b \times N_b$ diagonal matrices. The $$\frac{\partial \hat{\rho}^c}{\partial Y}$$

term is an $N_b \times N_b$ block diagonal matrix, one block per band, with $1 \times 2$ sub-blocks, because each $\hat{\rho}_i^c$ depends only on $\hat{\rho}_i^D$ and $\hat{\rho}_i^{SL}$, and not on $\hat{\rho}_j^D$ or $\hat{\rho}_j^{SL}$ for $j \neq i$. The $cov(\delta Y)$ term is an $N_b \times N_b$ block diagonal matrix with one block per band (because for individual materials the NEF does not compute the error covariance between bands), where each sub-block is a $2 \times 2$ matrix supplied by the NEF. Altogether, equation (32) shows that $S_{\delta \xi}$ is an $N_b \times N_b$ diagonal matrix.

$$S_{\delta \xi} = \underbrace{\frac{\partial \xi}{\partial X}}_{\substack{N_b \times N_b \text{ blk diag} \\ 1 \times 4 \text{ sub-blocks}}} \underbrace{cov(\delta X)}_{\substack{N_b \times N_b \text{ blk diag} \\ 4 \times 4 \text{ sub-blocks}}} \underbrace{\frac{\partial \xi^T}{\partial X}}_{\substack{N_b \times N_b \text{ blk diag} \\ 4 \times 1 \text{ sub-blocks}}} + \ldots 4 \times 4 \text{ diagonal} \quad (32)$$

$$\underbrace{\frac{\partial \hat{\rho}^t}{\partial L^t}}_{N_b \times N_b \text{ diagonal}} \underbrace{cov(\delta L^t)}_{N_b \times N_b \text{ diagonal}} \underbrace{\frac{\partial \hat{\rho}^{t^T}}{\partial L^t}}_{N_b \times N_b \text{ diagonal}} + \ldots 4 \times 4 \text{ diagonal}$$

$$\underbrace{\frac{\partial \hat{\rho}^c}{\partial Y}}_{\substack{N_b \times N_b \text{ blk diag} \\ 1 \times 2 \text{ sub-blocks}}} \underbrace{cov(\delta Y)}_{\substack{N_b \times N_b \text{ blk diag} \\ 2 \times 2 \text{ sub-blocks}}} \underbrace{\frac{\partial \hat{\rho}^{c^T}}{\partial Y}}_{\substack{N_b \times N_b \text{ blk diag} \\ 2 \times 1 \text{ sub-blocks}}} \quad \ldots 4 \times 4 \text{ diagonal}$$

In evaluating equation (32), the only term that has not already been calculated is $$\frac{\partial \xi}{\partial X}.$$

This term has the $N_b \times N_b$ block diagonal form with $1 \times 4$ sub-blocks shown in equation (33):

$$\frac{\partial \xi}{\partial X} = \begin{bmatrix} \frac{\partial \xi_1}{\partial X_1} & & \\ & \ddots & \\ & & \frac{\partial \xi_{N_b}}{\partial X_{N_b}} \end{bmatrix} \quad (33)$$

$$\frac{\partial \xi_i}{\partial X_i} = \begin{bmatrix} \frac{\partial \xi_i}{\partial \varepsilon_i} & \frac{\partial \xi_i}{\partial \alpha_i} & \frac{\partial \xi_i}{\partial \psi_i} & \frac{\partial \xi_i}{\partial L_i^b} \end{bmatrix}$$

Each entry $$\frac{\partial \xi_i}{\partial \varepsilon_i}$$

in equation (33) is calculated from quantities described in previous sections as shown in equation (34), where the band index i has been dropped:

$$\frac{\partial \xi}{\partial \varepsilon} \Delta \varepsilon \approx \xi(\varepsilon + \Delta \varepsilon) - \xi(\varepsilon) \quad (34)$$

$$= [\hat{\rho}^t(\varepsilon + \Delta \varepsilon) - \hat{\rho}^c(\varepsilon + \Delta \varepsilon)] - [\hat{\rho}^t(\varepsilon) - \hat{\rho}^c(\varepsilon)]$$

$$= [\hat{\rho}^t(\varepsilon + \Delta \varepsilon) - \hat{\rho}^t(\varepsilon)] - [\hat{\rho}^c(\varepsilon + \Delta \varepsilon) - \hat{\rho}^c(\varepsilon)]$$

$$= \delta \hat{\rho}^t(\Delta \varepsilon) - \delta \hat{\rho}^c(\Delta \varepsilon)$$

$$= \delta \hat{\rho}^t[0] - \delta \hat{\rho}^c[0]$$

By the same argument, the other entries of each of the blocks in equation (33) can be calculated as shown in equation (35).

$$\delta \xi[0] = \frac{\partial \xi}{\partial \varepsilon} \Delta \varepsilon \approx \delta \hat{\rho}^t[0] - \delta \hat{\rho}^c[0] \quad \ldots \text{extinction contribution} \quad (35)$$

$$\delta \xi[1] = \frac{\partial \xi}{\partial \alpha} \Delta \alpha \approx \delta \hat{\rho}^t[1] - \delta \hat{\rho}^c[1] \quad \ldots \text{absorption contribution}$$

$$\delta \xi[2] = \frac{\partial \xi}{\partial \psi} \Delta \psi \approx \delta \hat{\rho}^t[2] - \delta \hat{\rho}[2] \quad \ldots \text{assymetry contribution}$$

$$\delta \xi[3] = \frac{\partial \xi}{\partial L^b} \Delta L^b \approx \delta \hat{\rho}^t[3] - \delta \hat{\rho}^c[3] \quad \ldots \text{background radiance contribution}$$

Entry i of the diagonal matrix $cov(\delta \xi)$ is therefore given by equation (36):

$$\sigma_{\delta \xi_i}^2 = \left(\frac{\partial \xi_i}{\partial \varepsilon_i}\right)^2 \sigma_{\delta \varepsilon_i}^2 + \left(\frac{\partial \xi_i}{\partial \alpha_i}\right)^2 \sigma_{\delta \alpha_i}^2 + \quad (36)$$

$$\left(\frac{\partial \xi_i}{\partial \psi_i}\right)^2 \sigma_{\delta \psi_i}^2 + \left(\frac{\partial \xi_i}{\partial L_i^b}\right)^2 \sigma_{\delta L_i^b}^2 + \left(\frac{\partial \hat{\rho}_i^t}{\partial L_i^t}\right)^2 \sigma_{\delta L_i^t}^2 + \sigma_{\delta \rho_i^c, \delta \rho_i^{NEF}}^2$$

Equation (36) is evaluated using equations (25), (29) and (35) as shown in equation (37):

$$\sigma_{\delta \xi_i}^2 = \left(\delta \xi[0] \frac{\sigma_{\delta \varepsilon}}{\Delta \varepsilon}\right)^2 + \quad \ldots \text{extinction contribution} \quad (37)$$

$$\left(\delta \xi[1] \frac{\sigma_{\delta \alpha}}{\Delta \alpha}\right)^2 + \quad \ldots \text{absorption contribution}$$

$$\left(\delta \xi[2] \frac{\sigma_{\delta \psi}}{\Delta \psi}\right)^2 + \quad \ldots \text{asymmetry contribution}$$

$$\left(\delta \xi[3] \frac{\sigma_{\delta L^b}}{\Delta L^b}\right)^2 + \quad \ldots \text{background radiance contribution}$$

$$\left(\frac{L^t}{L^r}\right)^2 \sigma_{cal}^2 + \quad \ldots \text{target radiance contribution}$$

$$\sigma_{\delta \rho_i^c, \delta \rho_i^{NEF}}^2 \quad \ldots NEF \text{ error contribution}$$

Turning now to a multiple image case for determining delta reflectance and uncertainty, start with $\xi = [\xi_1 \ldots \xi_{N_{images}}]^T$, where $\xi_j(\hat{A}, \hat{L}_j^b, \hat{L}_j^t, \hat{\rho}_j^D, \hat{\rho}_j^{SL})$ is the delta-reflectance spectrum for image j and $\hat{A} = [\hat{\varepsilon}, \hat{\alpha}, \hat{\psi}]^T$ are the estimated aerosol parameters. Errors in the components of $\xi$ will be correlated through a common dependence on $\hat{A}$, but not on any of the other parameters because errors in the measurements for image j (i.e. $\hat{L}_j^b, \hat{L}_j^t, \hat{\rho}_j^D$ and $\hat{\rho}_j^{SL}$) are uncorrelated with each other and with those for image k (i.e. $\hat{L}_k^b, \hat{L}_k^t, \hat{\rho}_k^D$ and $\hat{\rho}_k^{SL}$) for $j \neq k$.

The covariance $S_{\delta\xi}$ of errors in $\xi$ therefore has the structure shown in equation (38):

$$S_{\delta\xi} = \begin{bmatrix} \ddots & & \\ & \text{cov}(\delta\xi_j, \delta\xi_j) & \text{cov}(\delta\xi_j, \delta\xi_k) \\ & & \ddots \\ & \text{cov}(\delta\xi_k, \delta\xi_j) & \text{cov}(\delta\xi_k, \delta\xi_k) \\ & & & \ddots \end{bmatrix} \quad (38)$$

In equation (38) j and k are image numbers. Each $\text{cov}(\delta\xi_j, \delta\xi_j)$ is a diagonal matrix whose $i^{th}$ entry is given by equation (36). Each $\text{cov}(\delta\xi_j, \delta\xi_k)$ is a diagonal matrix whose $i^{th}$ entry is given by equation (39):

$$\sigma_{\delta\xi_{j,i}\delta\xi_{k,i}} = \frac{\partial \xi_{j,i}}{\partial \varepsilon_i}\frac{\partial \xi_{k,i}}{\partial \varepsilon_i}\sigma_{\delta\varepsilon_i}^2 + \frac{\partial \xi_{j,i}}{\partial \alpha_i}\frac{\partial \xi_{k,i}}{\partial \alpha_i}\sigma_{\delta\alpha_i}^2 + \frac{\partial \xi_{j,i}}{\partial \psi_i}\frac{\partial \xi_{k,i}}{\partial \psi_i}\sigma_{\delta\psi_i}^2 \quad (39)$$

Calculation of Chi-Square Statistic

A chi-square statistic can be determined for the processes described in FIGS. 6 and 7 according to the following method. The method can be adapted for use in the processes described below and for other imaging modalities. The chi-square statistic is calculated as shown in equation (40) in both the single and multiple image cases. In the single image case, $\xi$ is an $N_{bands} \times 1$ vector and $S_{\delta\xi}$ is an $N_{bands} \times N_{bands}$ diagonal matrix whose $i^{th}$ entry is given by equation (36). In the multiple image case $\xi$ is an $[N_{images} \cdot N_{bands}] \times 1$ vector and $S_{\delta\xi}$ is an $[N_{images} \cdot N_{bands}] \times [N_{images} \cdot N_{bands}]$ matrix given by equations (38), (36) and (39).

$$\chi^2 = \xi^T \cdot S_{\delta\xi}^{-1} \cdot \xi \quad (40)$$

Performance of the Chi-Square Test for a Given Probability of Detection

When the correct candidate material is chosen, the expected value of $\hat{\rho}^t$ and $\hat{\rho}^c$ will be equal and the expected value of $\xi$ is 0. In this case, the $\chi^2$ statistic should have a chi-square distribution with number of degrees of freedom $v = N_{bands} \cdot N_{images}$. Denote its inverse cumulative distribution function by $Q_{\chi^2}$. For a given probability of detection $P_d$, a threshold x is set as shown in equation (41):

$$x = Q_{\chi^2}(P_d, v) \quad (41)$$

The chi-square test now reduces to the threshold test shown in equation (42):

$\chi^2 \leq x \Rightarrow$ candidate material matches the target $\chi^2 > x \Rightarrow$ candidate material does not match the target  (42)

This method can be adapted for in connection with the implementations for other imaging modalities described in FIGS. 8-13.

Non-Polarimetric Emissive Processing

Non-polarimetric emissive imagery—imagery generated by sensing the emitted and reflected radiance from the physical target using a non-polarimetric sensor—may be a single band; however, like non-polarimetric reflective imagery, non-polarimetric emissive imagery is preferably either multi-band or hyperspectral. Error sources for non-polarimetric imagery may include atmospheric conditions, radiometric calibration, BRDF measurements, and spectral calibration.

Figure 8:
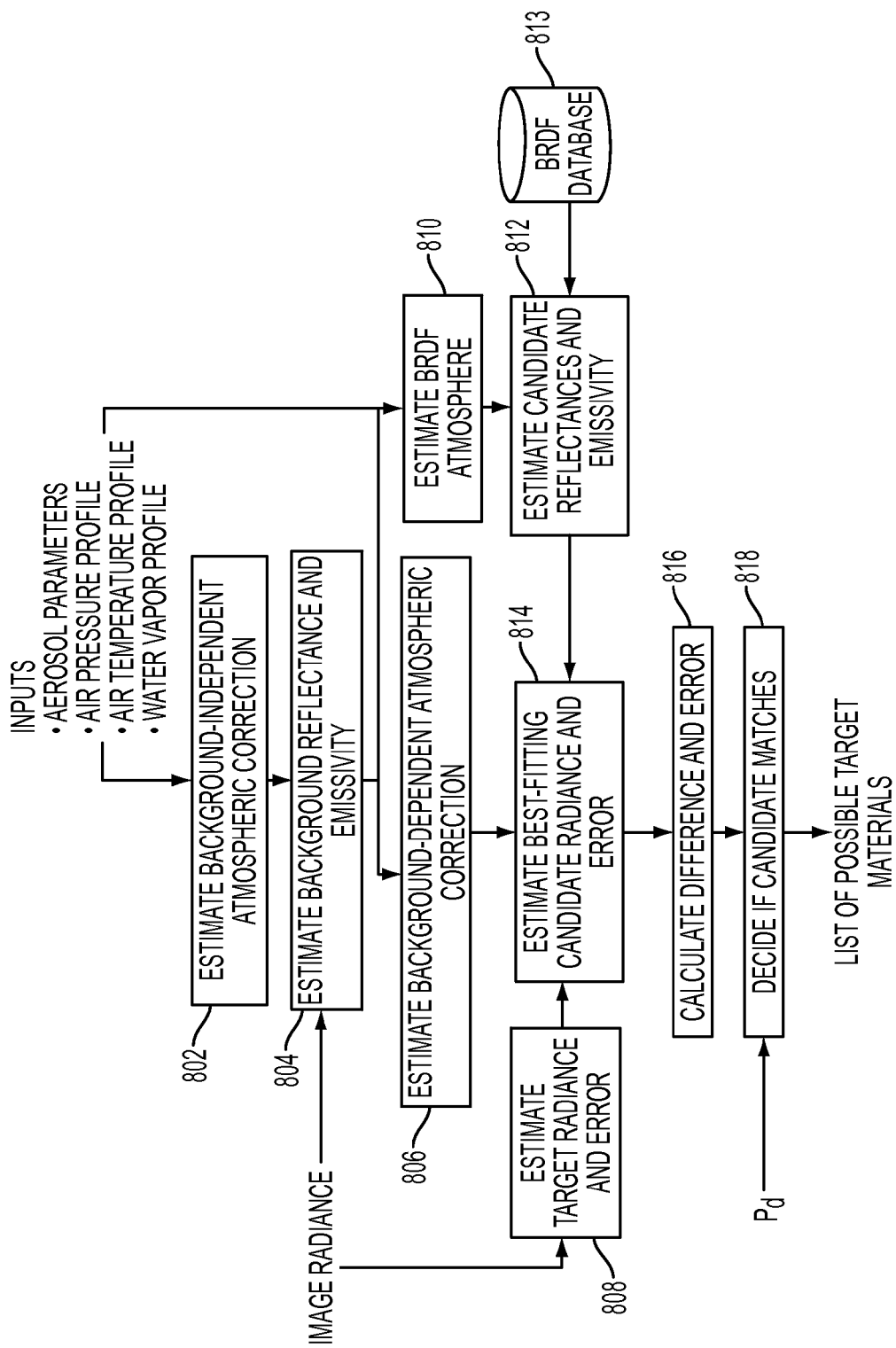
FIG. 8 is an example of an embodiment of a remote material identification process for non-polarimetric emissive imagery.

FIG. 8 illustrates an example of an implementation of the material identification process of FIG. 2 for non-polarimetric emissive imagery. For each image data set, the example in FIG. 8 utilizes the following inputs: information about the atmosphere through which emitted radiation was sensed; target and background radiance—such as that used in accordance with the non-polarimetric reflective case described above; the relative spectral response functions for each band in the images data set; candidate material surface properties; and uncertainties.

Data regarding the atmosphere includes the same aerosol parameters as described above in the non-polarimetric reflective case as well as an air pressure profile, air temperature profile, and humidity profile as a function of altitude above the target. Candidate material surface properties include directional emissivity and, as previously mentioned, diffuse reflectance and Lambertian-equivalent solar reflectance. Uncertainty inputs include radiance measurement uncertainty, error covariance matrix for the diffuse reflectance, Lambertian-equivalent solar reflectance and directional emissivity, aerosol parameter uncertainty, atmospheric uncertainty, and spectral calibration uncertainty for hyperspectral sensor imagery.

At step 802, a background-independent atmospheric correction, comprised of background-independent path terms, is estimated using the aerosol parameters, air pressure, air temperature, and humidity profiles determined in accordance with the altitude at which the sensor was located above the target when sensing the emissivity. The background-independent atmospheric path terms, shown below in Table 3, are combined with the image radiance data to estimate background reflectance and emissivity of the target as shown at step 804.

TABLE 3

| BIP Term | Description |
|---|---|
| $L_{AE}$ | Atmospherically emitted photons that propagate to the sensor aperture |
| $L_{AER}$ | Atmospherically emitted downwelling radiation that is reflected by a 100% Lambertian target and propagates directly to the sensor aperture |
| $L_{BAER}$ | Atmospherically emitted downwelling radiation that is reflected from a 100% Lambertian background once and scattered into the line of sight |
| $T_{AD}$ | Direct transmission of the atmosphere between the target and the sensor |
| $T_{AS}$ | Fraction of the background-leaving radiance that is transmitted to the sensor |

At step 806, the input data, background reflectance and emissivity, and background-independent path terms are combined to estimate a background-dependent atmospheric correction comprised of background-dependent path terms, shown below in Table 4. At step 808, the image radiance data is used to estimate the target radiance and the error corresponding to the target radiance.

TABLE 4

| BIP Term | Description |
|---|---|
| $L_{PT}$ | Photons emitted by the atmosphere or background that eventually scatter into the line of sight and propagate into the sensor field of view |
| $F_{MS\,BRDS}$ | Fraction of the background reflected solar radiation that is multiply scattered |

At step 810, the process uses the input data to estimate the BRDF atmosphere, which comprises atmospheric transmittances and downwelling radiance on the target. These terms are used to estimate the candidate reflectances and emissivity. At step 812, one or more candidate materials are selected from BRDF database 813; then, for each candidate material, band-effective Lambertian-equivalent candidate reflectance and emissivity spectra are predicted.

At step 814, the best-fitting candidate spectral radiance signature and its error are estimated using the estimated background-dependent atmospheric correction, target radiance signature and error, and the candidate reflectance and emissivity spectra determined at steps 806, 808 and 812, respectively. There are at least two methods for calculating the best-fitting candidate spectral radiance signature, and each method is dependent upon the temperature of the multi-angle target radiance signature calculated in step 808 and a candidate spectral radiance signature determined for one or more particular bands in the images data set.

Figure 9:
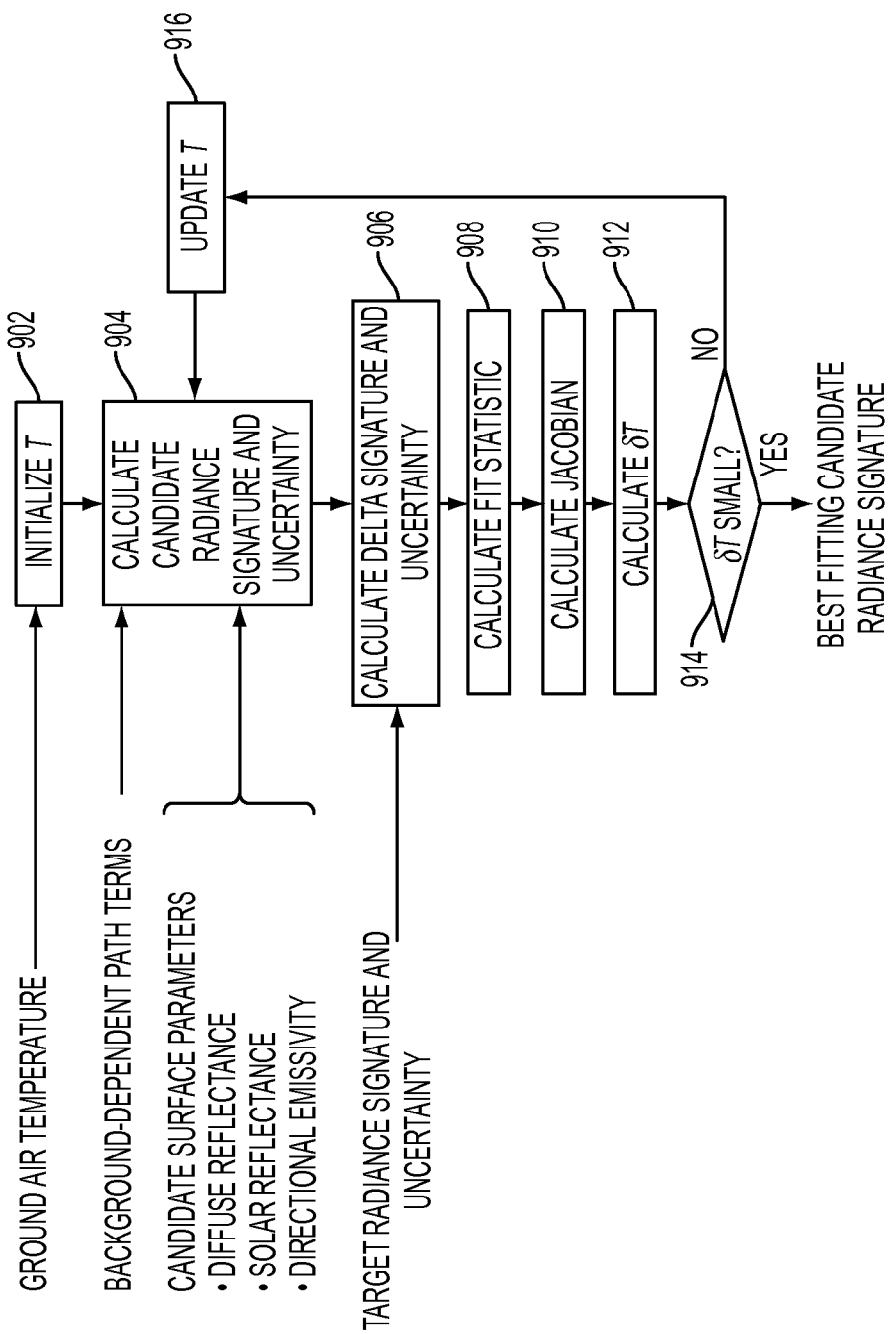
FIG. 9 is an example of a process for calculating a best-fitting candidate spectral radiance signature for the process of FIG. 8.

FIG. 9 illustrates a first method for calculating the best-fitting candidate spectral radiance signature, wherein the best-fitting candidate spectral radiance signature selected is determined by selecting a candidate spectral radiance signature having a temperature that best fits the temperature of the multi-angle target radiance signature. As illustrated in FIG. 9, the ground-level air temperature is provided as an initial temperature T in step 902. In step 904, a candidate spectral radiance signature and its uncertainty are calculated using the temperature T, the background-dependent path terms calculated in step 806 of FIG. 8, and the candidate surface parameters (i.e., directional emissivity, diffuse reflectance and Lambertian-equivalent solar reflectance). In step 906, the candidate spectral radiance signature and its uncertainty are compared with the target radiance signature and its uncertainty calculated in step 808 of FIG. 8 to calculate the delta signature and uncertainty.

In steps 908-912 of FIG. 9, a chi-square closeness-of-fit statistic, Jacobian matrix, and delta temperature $\delta T$ are respectively calculated for the delta signature and its uncertainty. In step 914, a determination is made as to whether the delta temperature $\delta T$ is small enough to indicate a match between the target radiance signature and the candidate spectral radiance signature, thus indicating that the candidate spectral radiance signature is, in fact, the best-fitting candidate spectral radiance signature. If the delta temperature $\delta T$ is too large, the candidate spectral radiance signature is assumed not to be the best-fitting candidate spectral radiance signature, the temperature T is updated in step 916, and steps 904-914 are repeated until the best-fitting candidate spectral radiance signature is determined.

Figure 10:
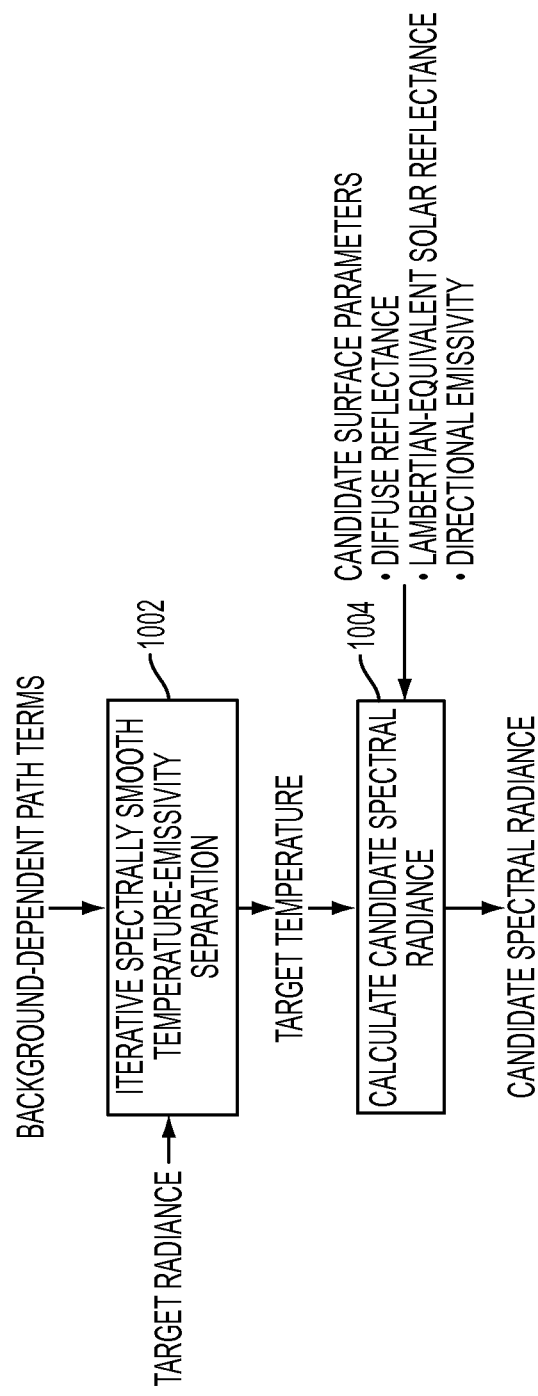
FIG. 10 is second example of a process for calculating a best-fitting candidate spectral radiance signature for the process of FIG. 8.

FIG. 10 illustrates a second method, namely, a hyperspectral method, for calculating the best-fitting candidate spectral radiance signature of step 814. In FIG. 10, the Iterative Spectrally Smooth Temperature-Emissivity Separation (ISSTES) method described in C. C. Borel, "Iterative retrieval of surface emissivity and temperature for a hyperspectral sensor", *Proc. 1st JPL Workshop Remote Sensing of Land Surface Emissivity*, published in 1997 by the Jet Propulsion Laboratory, is used to estimate the target temperature and the target spectral emissivity. In step 1002 of FIG. 10, the background-dependent path terms and target spectral radiance signature are provided as input to the ISSTES method to calculate the target temperature. In step 1004, the calculated target temperature and candidate surface parameters (i.e., directional emissivity, diffuse reflectance and Lambertian-equivalent solar reflectance) are then used to calculate a best-fitting candidate spectral radiance signature that corresponds to the target temperature and candidate surface parameters.

Referring back to FIG. 8, in step 816, a computer processor may be used to calculate the difference and error for the best-fitting candidate spectral radiance signature estimated in step 814. At step 818, the processor uses a threshold computed from the desired value for the $P_d$ (probability of detection) to determine whether the best-fitting candidate radiance of the target matches within a predetermined level of confidence of one of the one or more candidate spectral radiances estimated at step 814. Candidate spectral radiances that match are used to generate a list of possible target materials.

Polarimetric Reflective Processing

Figure 11:
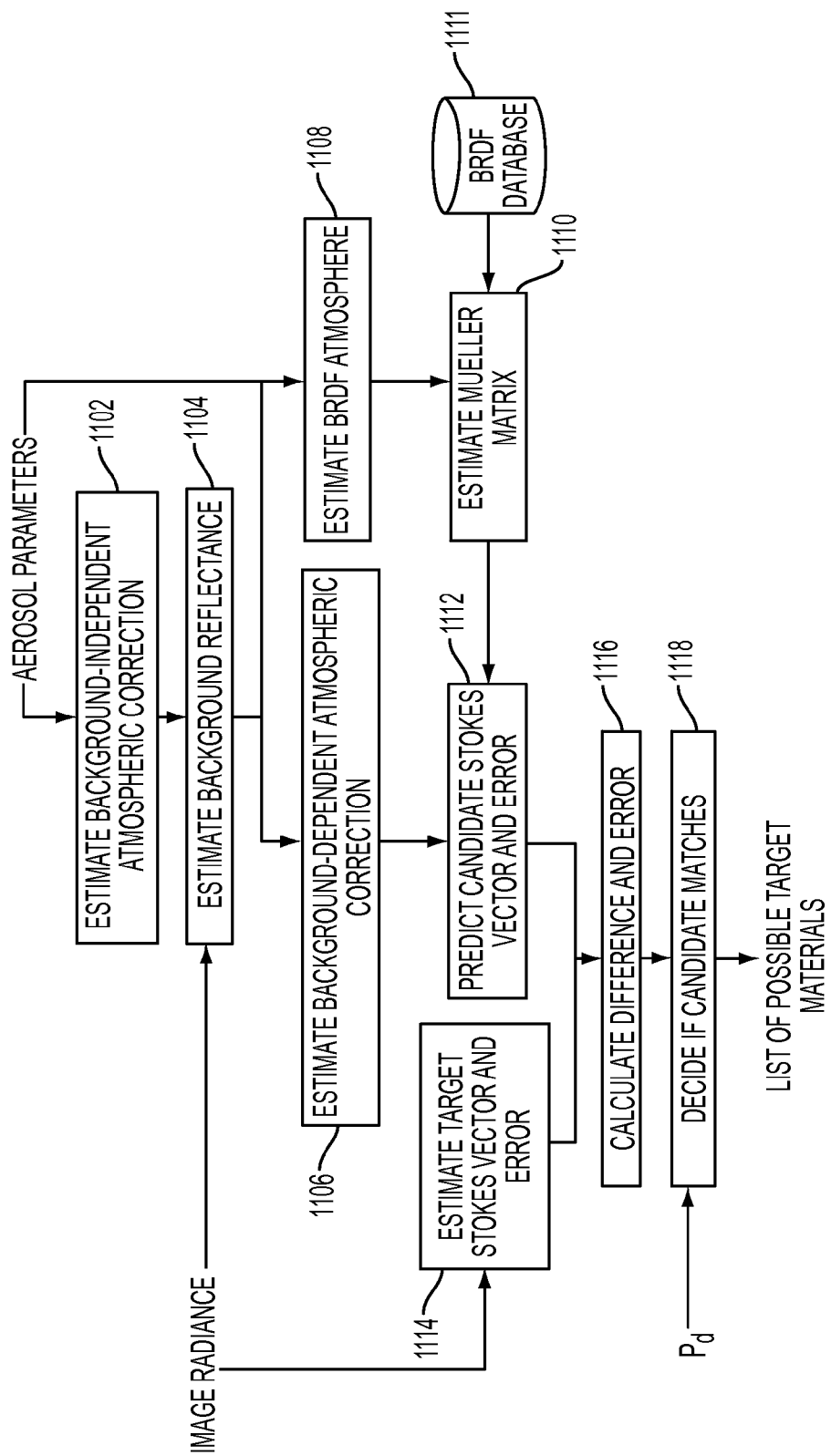
FIG. 11 is an example of an embodiment of a remote material identification process for polarimetric reflective imagery

Referring to FIG. 11, imagery generated by radiation reflecting off the physical target and sensed by a polarimetric sensor is referred to as polarimetric reflective imagery. The polarimetric sensor typically includes four orientations of polarization filters: 0°, 45°, 90°, and 135°, although it could be done with only three polarization filters. The polarimetric sensor measures a Stokes vector in each spectral band. Polarimetric reflective imagery may be single band, but is preferably either multi-band or hyperspectral. Because light reflected off the target and sensed by the polarimetric sensor may be incoherent, the target signature may be measured in a Mueller matrix parameter spectrum. Error sources for polarimetric reflective imagery may include atmospheric conditions, radiometric calibration, BRDF measurements, polarimetric calibration, and spectral calibration.

FIG. 11 illustrates an example of an implementation of the material identification process of FIG. 2 for polarimetric reflective imagery. For each image data set, the example in FIG. 11 utilizes the following inputs: atmospheric information (i.e., information about the atmosphere through which the radiation was sensed), candidate material surface properties, uncertainty inputs, relative spectral response functions, and background and target radiance measurements.

Data regarding the atmosphere includes the same aerosol parameters as described above in the non-polarimetric reflective process. For a polarimetric sensor, the relative spectral response functions typically consist of four functions per band—one for each orientation of the polarization filters (0°, 45°, 90°, and 135°). Additionally, the candidate material surface properties consist of a Mueller matrix in each band. The background and target radiance measurements consist of Stokes vectors in each band instead of the scalar measurements provided in the non-polarimetric reflective case. The uncertainty inputs include radiance measurement uncertainty, candidate material Mueller matrix uncertainty, aerosol parameter uncertainty, and spectral calibration uncertainty (for a hyperspectral case). The radiance measurement uncertainty comprises a covariance matrix for errors between the Stokes vector components in each band and, in the multispectral polarimetric case, for the errors between the bands. The candidate material Mueller matrix uncertainty comprises a covariance matrix for errors between all entries in the Mueller matrix, instead of for the diffuse and solar reflectance in the non-polarimetric reflective case.

In step 1102, the aerosol parameters are provided as input to determine background-independent atmospheric correction terms. The background-independent atmospheric correction terms are used in conjunction with the measured image radiance data to estimate background reflectance as shown in step 1104, assuming that the background consists of a non-polarizing material.

In step 1106, background-dependent atmospheric correction terms are estimated using the background reflectance data as well as the aerosol parameters. In step 1108, the process uses the input data to estimate the BRDF atmosphere needed for estimating the Mueller matrix. In step 1110, one or more candidate materials are selected from the BRDF database 1111; and the process estimates the Mueller matrix, which is used with the background-dependent path terms to predict candidate Stokes vectors and error bars in step 1112.

The predicted radiance for a candidate material, in this example, consists of a Stokes vector in each band (instead of the scalar values for the non-polarimetric reflective case described above). Calculation of these values involves the Stokes vectors describing the polarization state of the upwelling radiance, and operations with Mueller matrices for the material and the Stokes vectors describing the polarization state of the downwelling radiance.

In step 1114, the measured image radiance is used to estimate a target Stokes vector and its corresponding error bars. Finally, at step 1116, a computer processor may be used to calculate the difference and error for the predicted candidate Stokes vector and the estimated target Stokes vector. At step 1118, the processor uses a threshold computed from the desired value for the probability of detection ($P_d$) to determine whether the predicted candidate Stokes vector indicates a possible material matching the target.

Polarimetric Emissive Imagery

Figure 12:
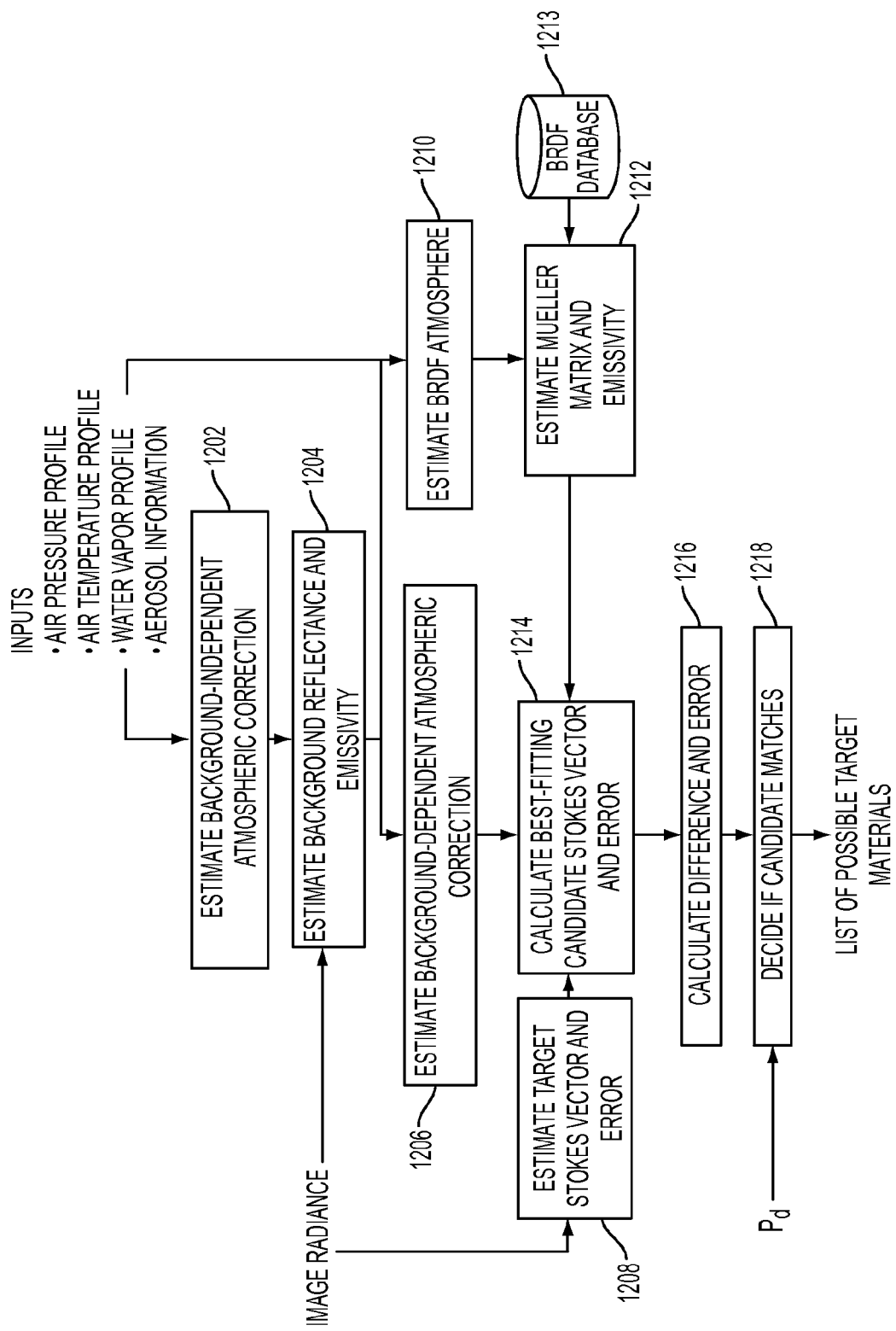
FIG. 12 is an example of an embodiment of a remote material identification process for polarimetric emissive imagery.

Referring to FIG. 12, imagery generated by sensing the emissivity of the physical target using a polarimetric sensor is referred to as polarimetric emissive imagery. The polarimetric sensor typically includes four orientations of polarization filters: 0°, 45°, 90°, and 135°, and measures a Stokes vector in each spectral band. Polarimetric emissive imagery may be single band, but is preferably either multi-band or hyperspectral. Error sources for polarimetric reflective imagery may include atmospheric conditions, radiometric calibration, BRDF measurements, polarimetric calibration, and spectral calibration.

FIG. 12 illustrates an example of processing polarimetric emissive imagery in accordance with the material identification process of FIG. 2. For each image data set, the example in FIG. 12 utilizes the following inputs: relative spectral response functions similar to those provided in the polarimetric reflective case, atmospheric information similar to that provided in the non-polarimetric emissive case, background and target radiance measurements similar to those provided in the polarimetric reflective case, candidate material surface properties, and uncertainty inputs.

The candidate material surface properties include a Mueller matrix in each spectral band such as that in the polarimetric reflective case, and polarized directional emissivity. Uncertainty inputs include radiance measurement uncertainty such as that provided in the polarimetric reflective case, candidate material property uncertainty comprising a covariance matrix for the errors between all entries in the Mueller matrix, a covariance matrix for the emissivity values in each band, and a covariance matrix for errors between the Mueller matrix entries and the emissivity values, atmospheric parameter uncertainty such as that provided in the non-polarimetric case, and spectral calibration uncertainty for the hyperspectral case.

In step 1202 of FIG. 12, a background-independent atmospheric correction, comprised of background-independent path terms, is estimated using the input data. The background-independent atmospheric path terms are combined with the image radiance data to estimate background reflectance and emissivity of the target as shown at step 1204, assuming that the background consists of a non-polarizing material.

At step 1206, the input data, background reflectance and emissivity, and background-independent path terms are combined to estimate a background-dependent atmospheric correction comprised of background-dependent path terms. At step 1208, the image radiance data is used to estimate the target Stokes vector and the error corresponding to the target Stokes vector.

At step 1210, the process uses the input data to estimate the BRDF atmosphere needed for estimating the Mueller matrix and emissivity. At step 1212, one or more candidate materials are selected from BRDF database 1213; then, for each candidate material, a Mueller matrix and emissivity are estimated. The predicted radiance for a candidate material comprises a Stokes vector in each band, wherein calculation of these values involves operations similar to those used for the polarimetric reflective case, plus the calculation of the thermal emission contributions from the atmosphere and the target. In step 1214, the best-fitting candidate Stokes vector and its error are determined by comparing the candidate Stokes vector to the estimated target Stokes vector.

At step 1216, a computer processor may be used to calculate the difference and error for the best-fitting candidate Stokes vector and the estimated target Stokes vector. At step 1218, the processor uses a threshold computed from the desired value for the probability of detection ($P_d$) to determine whether the best-fitting candidate Stokes vector indicates a possible material matching the target.

Synthetic Aperture Radar (SAR) Imagery Processing

Figure 13:
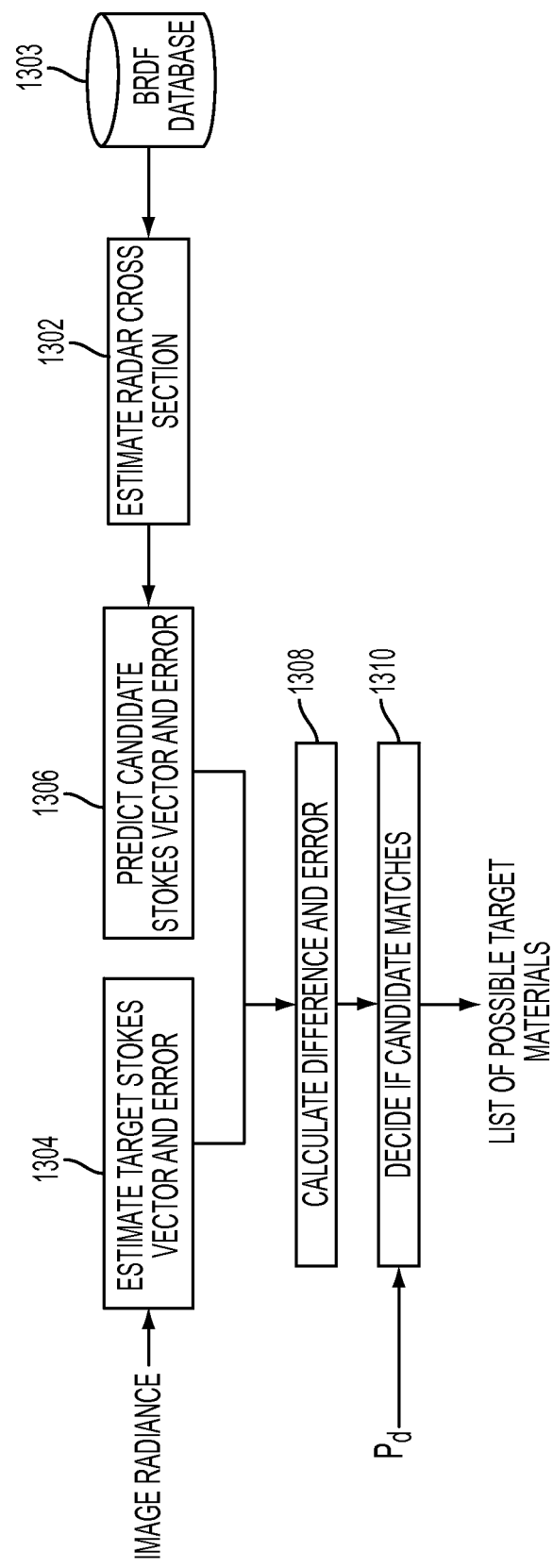
FIG. 13 is an example of an embodiment of a remote material identification process for synthetic aperture array imagery.

Referring to FIG. 13, SAR imagery is generated by sensing radiance of the physical target in the microwave region of the spectrum. For SAR imagery, two configurations are possible: mono-static SAR and multi-static SAR. For a mono-static SAR configuration, at least one image is taken near the normal orientation of the target surface, and at least one image is taken far from the normal orientation. For a multi-static SAR configuration, at least one image is taken near the specular direction, and at least one image is taken far from the specular direction. The target signature for SAR imagery may be measured in terms of the radar cross-section spectrum. Accordingly, error sources for SAR imagery may include atmospheric conditions, radiometric calibration, and BRDF measurements.

FIG. 13 illustrates processing of SAR imagery in the radiance domain. The inputs specific to this example include the following: target radiance measurements consisting of Stokes vectors in each band, candidate material surface properties consisting of the radar cross-section for a material with respect to the polarization state of the incident and reflected waves, and uncertainty inputs. The uncertainty inputs include radiance measurement uncertainty and candidate material property uncertainty consisting of a covariance matrix for the errors between all entries in the Mueller matrix such as for the polarimetric reflective case. A primary difference between SAR and the other modalities is the presence of specular noise resulting from coherent interference during image processing.

In step 1302 of FIG. 13, a radar cross-section is estimated using one or more candidate materials selected from the BRDF database 1303. The predicted radiance for a candidate material, in this example, consists of a Stokes vector in each band. These values are calculated using microwave diffraction theory. In step 1304, a target Stokes vector and its error are estimated using the measured image radiance data. In step 1306, the candidate Stokes vector and its error are predicted using the radar cross-section data estimated in step 1302. As shown in step 1308, by calculating the difference in the signatures of the candidate Stokes vector and the estimated target Stokes vector, it may be determined that the material selected from the BRDF database may be added to the list of possible target materials, as shown at step 1310.

The foregoing description is of exemplary and preferred embodiments employing at least in part certain teachings of the invention. The invention, as defined by the appended claims, is not limited to the described embodiments. Alterations and modifications to the disclosed embodiments may be made without departing from the invention as set forth in the amended claims. The meaning of the terms used in this specification are, unless expressly stated otherwise, intended to have ordinary and customary meaning and are not intended to be limited to the details of the illustrated structures or the disclosed embodiments.

What is claimed is:

1. A method performed by a specially programmed computer of remotely identifying material of which a physical target is made, the method comprising:

delineating, with the specially programmed computer, within each of at least two images the same physical target, at least one of which is polarimetric reflective image that includes, but is not necessarily limited to, radiation reflected from the physical target, at least two of the least two images being taken by one or more sensors from different acquisition angles, each of the at least two images containing spectral radiance information for the physical target in at least one predetermined band;

determining, using the specially programmed computer, an estimated target spectral signature for the target within each of the at least two images based at least in part on the radiance of the target in each of the images;

determining, with the specially programmed computer, for each of the at least two acquisition angles, a predicted candidate spectral signature for a preselected candidate material based at least in part on the acquisition angle, the determination of the predicted candidate spectral signature for each of the at least one polarimetric reflective image includes a determining an estimated Mueller matrix based on a predetermined bidirectional reflectance distribution function (BRDF) for the preselected candidate material, and using the Mueller matrix to determine a candidate Stokes vector for the candidate material, the Stokes vector comprising the candidate spectral signature for the candidate material; and deciding with the specially programmed computer, based on a predetermined probability threshold, whether the candidate material and the target material match by comparing the estimated target signatures and the predicted candidate signatures.

2. The method of claim 1, wherein the estimated spectral target signature for each of the at least one polarimetric reflective image comprises a Stokes vector.

3. The method of claim 1, wherein at least two images includes at least two polarimetric reflective images acquired at different acquisitions angles, at least one of which is within a forward scattering lobe of radiation being reflected from the target, and the other of which is outside the forward scattering lobe.

4. The method of claim 1, further including determining, using the specially programmed computer, errors for the target spectral signatures and the candidate spectral signatures.

5. A non-transitory computer-readable storage media for storing program instructions for a computing system that, when executed by the computing system, cause it to perform a method of remotely identifying material of which a physical target is made, the method comprising:

delineating within each of at least two images the same physical target, at least one of which is polarimetric reflective image that includes, but is not necessarily limited to, radiation reflected from the physical target, at least two of the least two images being taken by one or more sensors from different acquisition angles, each of the at least two images containing spectral radiance information for the physical target in at least one predetermined band;

determining an estimated target spectral signature for the target within each of the at least two images based at least in part on the radiance of the target in each of the images;

determining for each of the at least two acquisition angles, a predicted candidate spectral signature for a preselected candidate material based at least in part on the acquisition angle, the determination of the predicted candidate spectral signature for each of the at least one polarimetric reflective image including determining an estimated Mueller matrix based on a predetermined bidirectional reflectance distribution function (BRDF) for the preselected candidate material, and using the Mueller matrix to determine a candidate Stokes vector for the candidate material, the Stokes vector comprising the candidate spectral signature for the candidate material; and deciding, based on a predetermined probability threshold, whether the candidate material and the target material match by comparing the estimated target signatures and the predicted candidate signatures.

6. The non-transitory computer-readable storage media of claim 5, wherein the estimated spectral target signature for each of the at least one polarimetric reflective image comprises a Stokes vector.

7. The non-transitory computer-readable storage media of claim 5, wherein at least two images includes at least two polarimetric reflective images acquired at different acquisitions angles, at least one of which is within a forward scattering lobe of radiation being reflected from the target, and the other of which is outside the forward scattering lobe.

8. The non-transitory computer-readable storage media of claim 5, wherein the method further includes determining for the estimated target spectral signatures and the candidate spectral signatures.

9. Apparatus for performing a method of remotely identifying material of which a physical target is made, comprising:

means for delineating within each of at least two images the same physical target, at least one of which is polarimetric reflective image that includes, but is not necessarily limited to, radiation reflected from the physical target, at least two of the least two images being taken by one or more sensors from different acquisition angles, each of the at least two images containing spectral radiance information for the physical target in at least one predetermined band;

means for determining an estimated target spectral signature for the target within each of the at least two images based at least in part on the radiance of the target in each of the images;

means for determining for each of the at least two acquisition angles, a predicted candidate spectral signature for a preselected candidate material based at least in part on the acquisition angle, the means for determining including means for predicting the candidate spectral signature for each of the at least one polarimetric reflective image by determining an estimated Mueller matrix based on a predetermined bidirectional reflectance distribution function (BRDF) for the preselected candidate material, based on the acquisition angle for the image, and using the Mueller matrix to determine a candidate Stokes vector for the candidate material, the Stokes vector comprising the candidate spectral signature for the candidate material; and means for deciding, based on a predetermined probability threshold, whether the candidate material and the target material match by comparing the estimated target signatures and the predicted candidate signatures.

10. The apparatus of claim 9, wherein the estimated spectral target signature for each of the at least one polarimetric reflective image comprises a Stokes vector.

11. The apparatus of claim 9, wherein at least two images includes at least two polarimetric reflective images acquired at different acquisitions angles, at least one of which is within a forward scattering lobe of radiation being reflected from the target, and the other of which is outside the forward scattering lobe.

12. The apparatus of claim 9, further comprising means for determining errors for the target spectral signatures and the candidate spectral signatures.

* * * * *

UNITED STATES PATENT AND TRADEMARK OFFICE
CERTIFICATE OF CORRECTION

PATENT NO. : 8,532,958 B2
APPLICATION NO. : 12/851991
DATED : September 10, 2013
INVENTOR(S) : Ingram et al.

It is certified that error appears in the above-identified patent and that said Letters Patent is hereby corrected as shown below:

In the Specifications

In column 3, line 44, delete "imagery" and insert --imagery.--, therefor

In column 4, line 42, delete "and," and insert --and--, therefor

In column 6, line 14, delete "and," and insert --and--, therefor

In column 7, line 20, delete "216" and insert --216,--, therefor

In column 7, line 37, after "210,", insert --212,--, therefor

In column 12, line 5 (Approx.), delete "$\overrightarrow{HDP[s]}$" and insert --$\overrightarrow{HDP[s]}$--, therefor.

In column 12, line 6 (Approx.), delete "$\overrightarrow{HDP[s]}$" and insert --$\overrightarrow{HDP[s]}$--, therefor.

In column 13, line 35-36 (Approx.), delete "$K_{est}(\lambda),$" and insert --$K_{ext}(\lambda),$--, therefor In column 13, line 37 (Approx.), delete "$K_{est}(0.441),$" and insert --$K_{ext}(0.441),$--, therefor In column 13, line 38 (Approx.), delete "$K_{est}(0.673),$" and insert --$K_{ext}(0.673),$--, therefor In column 13, line 39 (Approx.), delete "$K_{est}(0.873),$" and insert --$K_{ext}(0.873),$--, therefor In column 13, line 39 (Approx.), delete "asym (0.873)." and insert --asym(0.873).--, therefor In column 13, line 41 (Approx.), delete "$K_{est}(1.022),$" and insert --$K_{ext}(1.022),$--, therefor Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,532,958 B2

In column 13, line 41 (Approx.), delete "$K_{abs}$ (1.022)" and insert --$K_{abs}(1.022)$--, therefor In column 14, line 49 (Approx.), after "$(\epsilon+\Delta\epsilon,\alpha,\Psi)$", insert --,--, therefor In column 14, line 65, delete " $\rho_i^b=\rho(\epsilon_i,\alpha_i,\Psi_i,L_i^b)$ " and insert -- $\rho_i^b=\rho^b(\epsilon_i,\alpha_i,\Psi_i,L_i^b)$ --, therefor In column 15, line 16-17 (Approx.), delete " $\rho^b(L^b,\epsilon\alpha,\Psi)$ " and insert -- $\rho^b(L^b,\epsilon,\alpha,\Psi)$ --, therefor In column 15, line 66 (Approx.), delete "$\sigma_{\delta}^b,_{\delta\epsilon}$" and insert -- $\sigma_{\delta\rho^b},_{\delta\epsilon}$ --, therefor In column 16, line 3, delete "$\sigma_{\delta}^b,_{\delta\alpha}$" and insert -- $\sigma_{\delta\rho^b},_{\delta\alpha}$ --, therefor In column 16, line 3, delete "$\sigma_{\delta}^b,_{\delta\Psi}$" and insert -- $\sigma_{\delta\rho^b},_{\delta\Psi}$ --, therefor In column 16, line 31 (Approx.), delete " $\sigma_{\delta\rho^b,\delta\epsilon} \approx \delta\rho^b[1]\frac{\sigma_{\delta\epsilon}}{\Delta\alpha}$ " and insert -- $\sigma_{\delta\rho^b,\delta\alpha} \approx \delta\rho^b[1]\frac{\sigma_{\delta\alpha}}{\Delta\alpha}$ --, therefor In column 16, line 31 (Approx.), delete "$\sigma_{\delta}^b,_{\delta L}^b$" and insert -- $\sigma_{\delta\rho^b},_{\delta L}^b$ --, therefor In column 16, line 55, delete "$\sigma_{\delta}^b$" and insert -- $\sigma_{\delta\rho^b}$ --, therefor In column 16, line 60 (Approx.), delete " $\sigma_{\delta\rho^b}=\sqrt{\sigma_{\delta\rho^b,\delta L^b}^2+\sigma_{\delta\rho^b,\delta\epsilon}^2+\sigma_{\delta\rho^b,\delta\alpha}^2+\sigma_{\delta\rho^b,\delta\Psi}^2}$ " and insert -- $\sigma_{\delta\rho^b}=\sqrt{\sigma_{\delta\rho^b,\delta L^b}^2+\sigma_{\delta\rho^b,\delta\epsilon}^2+\sigma_{\delta\rho^b,\delta\alpha}^2+\sigma_{\delta\rho^b,\delta\Psi}^2}$ --, therefor In column 20, line 27 (Approx.), delete "$X=(X_1...X_{Nb})$", and insert --$X=(X_1,...,X_{Nb})$,--, therefor In column 20, line 28 (Approx.), delete "$Y_{Nb}$." and insert --$Y_{Nb})$.--, therefor In column 20, line 65 (Approx.), after "each", insert --$\xi_i$--, therefor In column 22, line 35 (Approx.), delete " $\sigma_{\delta\epsilon_i}^2=\left(\frac{\partial\xi_i}{\partial\epsilon_i}\right)^2\sigma_{\delta\epsilon_i}^2$ " and insert -- $\sigma_{\delta\xi_i}^2=\left(\frac{\partial\xi_i}{\partial\epsilon_i}\right)^2\sigma_{\delta\epsilon_i}^2$ --, therefor